US008028846B2

(12) United States Patent
Peota et al.

(10) Patent No.: US 8,028,846 B2
(45) Date of Patent: Oct. 4, 2011

(54) FLEXIBLE SHELVING SYSTEM

(75) Inventors: Robert D. Peota, Minneapolis, MN (US); Robert D. Yoder, Middlebury, IN (US); Andrew A. Enyart, Middlebury, IN (US); Mark A. Campbell, Middlebury, IN (US); Steven C. Thompson, Elkhart, IN (US)

(73) Assignee: Target Brands, Inc., Minneapolis, MN (US)

( * ) Notice: Subject to any disclaimer, the term of this patent is extended or adjusted under 35 U.S.C. 154(b) by 553 days.

(21) Appl. No.: 12/205,542

(22) Filed: Sep. 5, 2008

(65) Prior Publication Data

US 2010/0059467 A1   Mar. 11, 2010

(51) Int. Cl.
*A47B 43/00* (2006.01)

(52) U.S. Cl. ......... 211/187; 211/204; 211/190; 108/108

(58) Field of Classification Search .................. 211/186, 211/190, 187, 207, 204, 206, 189, 103; 108/106–108, 147.17; 248/159, 165, 188.1, 248/188.7, 346.3
See application file for complete search history.

(56) References Cited

U.S. PATENT DOCUMENTS

| 2,787,382 | A | * | 4/1957 | Williams | 108/157.13 |
|---|---|---|---|---|---|
| 2,956,688 | A | | 10/1960 | Galassi | |
| 2,958,427 | A | * | 11/1960 | Bianchi | 108/108 |
| 2,991,889 | A | * | 7/1961 | Levy et al. | 211/190 |
| 3,040,905 | A | * | 6/1962 | Gingher et al. | 108/108 |
| 3,044,632 | A | * | 7/1962 | Schild | 108/92 |
| 3,081,718 | A | * | 3/1963 | Shoffner | 108/108 |
| 3,159,437 | A | * | 12/1964 | Jentzen | 312/108 |
| 3,186,363 | A | | 6/1965 | Moore | |
| 3,200,775 | A | * | 8/1965 | Peters | 108/108 |
| 3,209,709 | A | * | 10/1965 | Shoffner | 108/27 |
| 3,297,374 | A | * | 1/1967 | Radek | 312/108 |
| 3,316,863 | A | * | 5/1967 | Zock | 108/108 |
| 3,346,124 | A | | 10/1967 | Sobel | |
| 3,502,292 | A | | 3/1970 | Yoder | |
| 3,598,066 | A | * | 8/1971 | Polezoes et al. | 108/187 |
| 3,601,256 | A | | 8/1971 | Bowers, Jr. et al. | |
| 3,601,346 | A | * | 8/1971 | Fenwick et al. | 248/188.1 |
| 3,602,159 | A | * | 8/1971 | Marschak | 108/187 |
| 3,626,870 | A | * | 12/1971 | Schild | 108/108 |
| 3,640,389 | A | * | 2/1972 | Snyder | 211/187 |
| 3,856,148 | A | | 12/1974 | Olinick | |
| D243,891 | S | | 4/1977 | Snyder | |

(Continued)

OTHER PUBLICATIONS

Robert D. Peota et al., Flexible Shelving System, Design Patent U.S. Appl. No. 29/324,104, filed Sep. 5, 2008, 21 pages.

(Continued)

*Primary Examiner* — Darnell M Jayne
*Assistant Examiner* — Devin Barnett
(74) *Attorney, Agent, or Firm* — Griffiths & Seaton PLLC

(57) ABSTRACT

Assembly of a structurally sound modular shelving system includes forming an H-shaped base structure, or otherwise-shaped base structure, by releasably hooking a tie beam into a first base piece and a second base piece. A first column member is slid into the first base piece by sliding an insert tab at an end of an elongate body of the first column into a vertical passage through the first base piece. A second column member is similarly slid into a second base piece. A header member is releasably hooked into the first and second columns, the header member extending substantially horizontally between the first and second columns and substantially perpendicularly to the first and second base pieces.

13 Claims, 17 Drawing Sheets

U.S. PATENT DOCUMENTS

| | | | | |
|---|---|---|---|---|
| 4,055,253 A | * | 10/1977 | Oztekin | ............. 211/189 |
| 4,064,996 A | | 12/1977 | Shillum | |
| 4,065,904 A | | 1/1978 | Taylor et al. | |
| 4,287,994 A | | 9/1981 | Klein | |
| 4,312,086 A | * | 1/1982 | Bianco | ............. 5/2.1 |
| 4,450,775 A | | 5/1984 | Brendle | |
| 4,460,097 A | | 7/1984 | Darnell, II et al. | |
| 4,564,111 A | | 1/1986 | Suttles | |
| 4,607,754 A | | 8/1986 | Wolf | |
| 4,646,656 A | * | 3/1987 | Marschak | ............. 108/108 |
| 4,850,285 A | | 7/1989 | Suttles | |
| 4,919,282 A | | 4/1990 | Duff et al. | |
| D321,100 S | | 10/1991 | Dorrell | |
| 5,295,446 A | | 3/1994 | Schafer | |
| 5,313,891 A | * | 5/1994 | Suttles | ............. 108/108 |
| 5,348,170 A | * | 9/1994 | Thornley et al. | ............. 211/187 |
| 5,433,327 A | * | 7/1995 | Benvenuti et al. | ............. 211/193 |
| 5,490,600 A | | 2/1996 | Bustos | |
| 5,531,168 A | * | 7/1996 | Towfigh | ............. 108/108 |
| 5,538,213 A | * | 7/1996 | Brown | ............. 248/222.11 |
| 5,607,070 A | * | 3/1997 | Hellyer | ............. 211/189 |
| 5,660,287 A | | 8/1997 | Tryon | |
| D397,562 S | | 9/1998 | DePottey et al. | ............. D6/468 |
| 5,871,108 A | * | 2/1999 | White | ............. 211/186 |
| 5,890,607 A | * | 4/1999 | Maglione | ............. 211/189 |
| 5,918,750 A | * | 7/1999 | Jackson | ............. 211/189 |
| 6,029,833 A | * | 2/2000 | Yeh | ............. 211/189 |
| D427,457 S | | 7/2000 | Heiny et al. | |
| D431,937 S | | 10/2000 | Heiny et al. | |
| 6,164,467 A | * | 12/2000 | DePottey et al. | ............. 211/189 |
| D440,433 S | | 4/2001 | Heiny et al. | |
| D441,571 S | | 5/2001 | Heiny et al. | |
| 6,223,916 B1 | | 5/2001 | Enos | |
| 6,422,523 B1 | | 7/2002 | Weshler | |
| 6,561,365 B2 | | 5/2003 | Bustos | |
| 6,581,787 B2 | * | 6/2003 | Barrett et al. | ............. 211/59.2 |
| 6,585,120 B2 | | 7/2003 | Robertson | |
| 6,669,037 B1 | * | 12/2003 | Ahn | ............. 211/189 |
| D495,531 S | | 9/2004 | Allshouse et al. | |
| 7,270,242 B2 | | 9/2007 | Liu | |
| D554,919 S | | 11/2007 | Clark et al. | |
| 7,448,634 B1 | * | 11/2008 | Raub | ............. 280/79.3 |
| 7,611,111 B2 | * | 11/2009 | Costa et al. | ............. 248/243 |
| 2004/0055514 A1 | * | 3/2004 | De Land et al. | ............. 108/108 |
| 2004/0211741 A1 | * | 10/2004 | Bustos et al. | ............. 211/187 |
| 2007/0267375 A1 | | 11/2007 | Battaglia et al. | |
| 2008/0128319 A1 | | 6/2008 | Noble Colin et al. | |

OTHER PUBLICATIONS

Lozier, Catalog, See-Thru Island Extension Sections, http://www.lozier.com/Pages/BrowseCatalog.asp, Jun. 1, 2005, p. 116.
Lozier, Catalog, Open Back System, http://www.lozier.com/Pages/BrowseCatalog.asp, Jun. 1, 2005, p. 133.
Lozier, Catalog, Uprites, http://www.lozier.com/Pages/BrowseCatalog.asp, Feb. 16, 2007, p. 120.
Lozier, Catalog, Steel Display Deck, http://www.lozier.com/Pages/BrowseCatalog.asp, Nov. 1, 2007, p. 134.
Syndicate Systems, Inc., Catalog, E-Line Store Fixturing System Accessories, Dec. 28, 1998, p. 200.
Madix Store Fixtures, Product Catalog, May 2005, 160 pages.
Streater, Inc., Product Catalog, Nov. 15, 2006, 71 pages.
Steven C. Thompson, Statements Regarding Information Submission, Feb. 5, 2009, 13 pages.

* cited by examiner

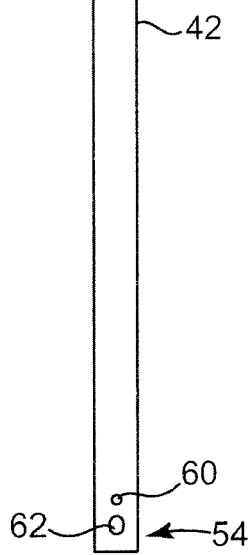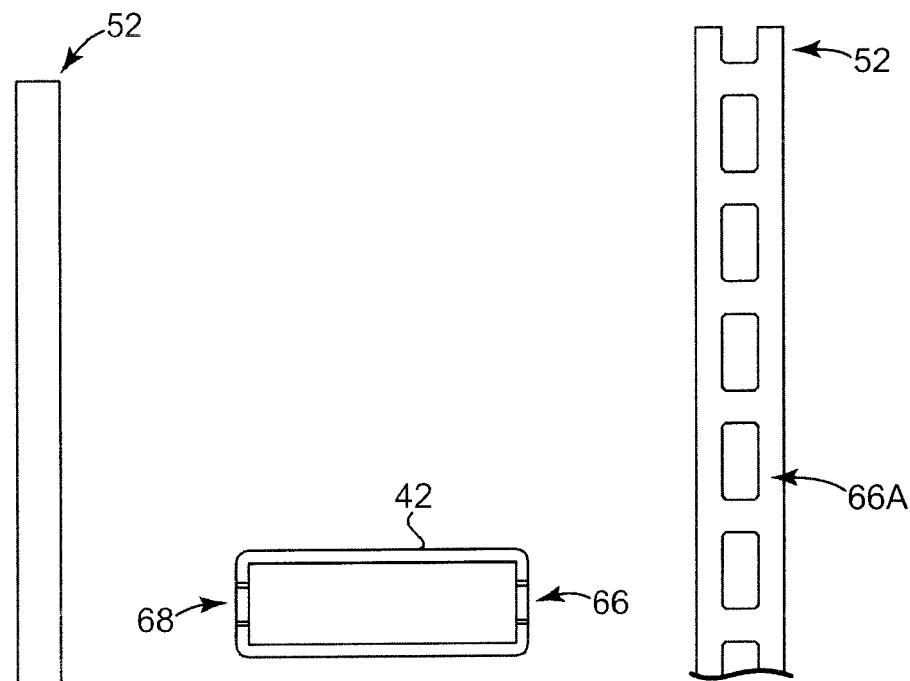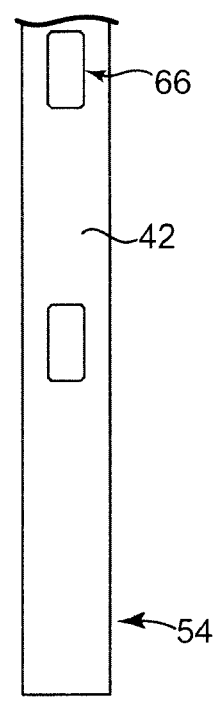
Fig. 6
Fig. 7
Fig. 8

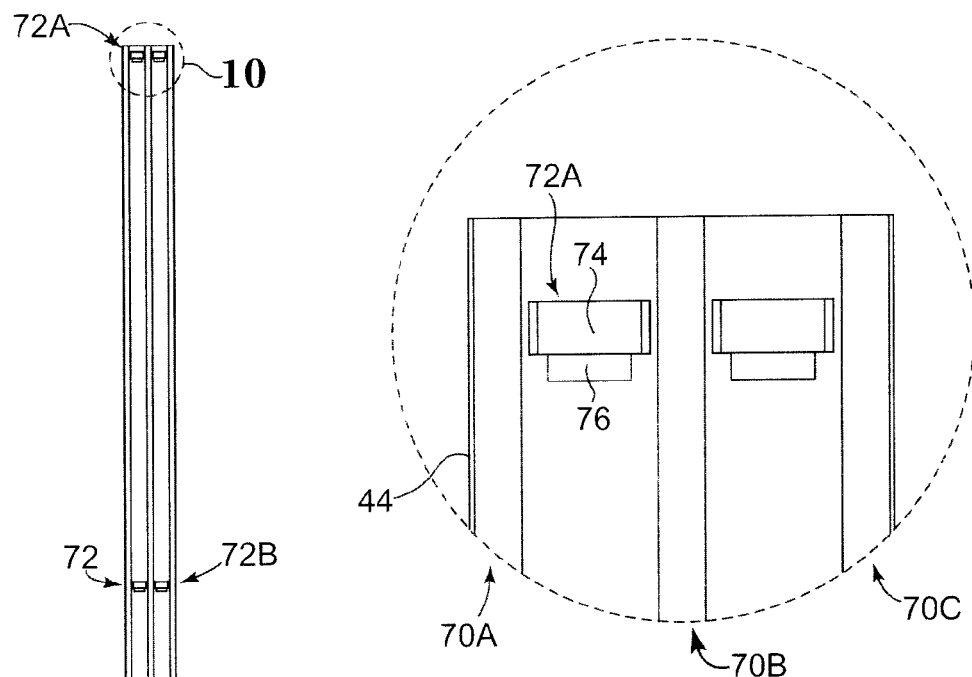
Fig. 10
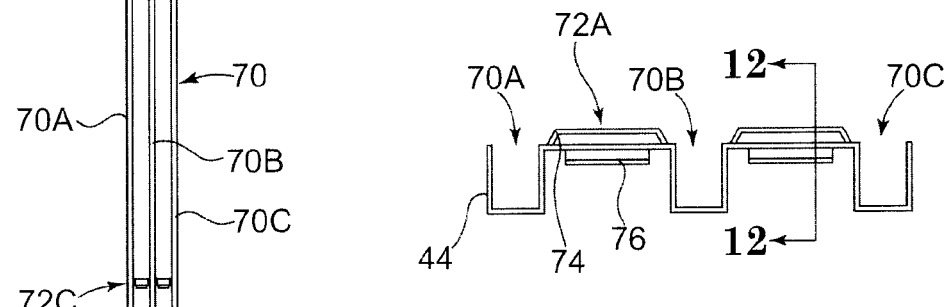
Fig. 11
Fig. 12
Fig. 9

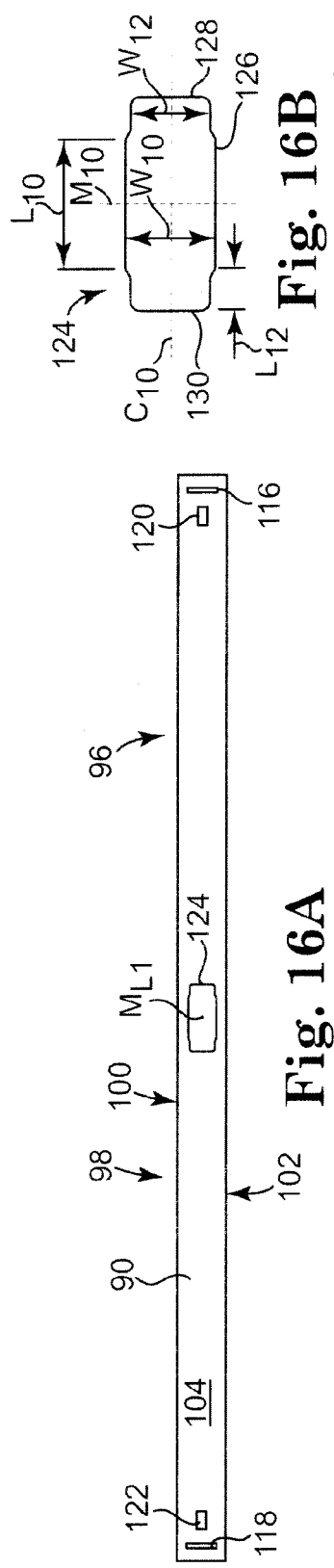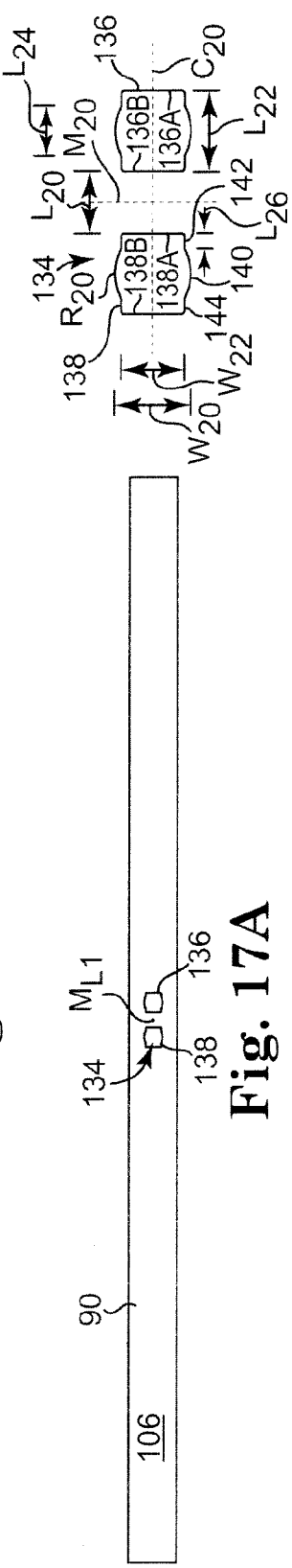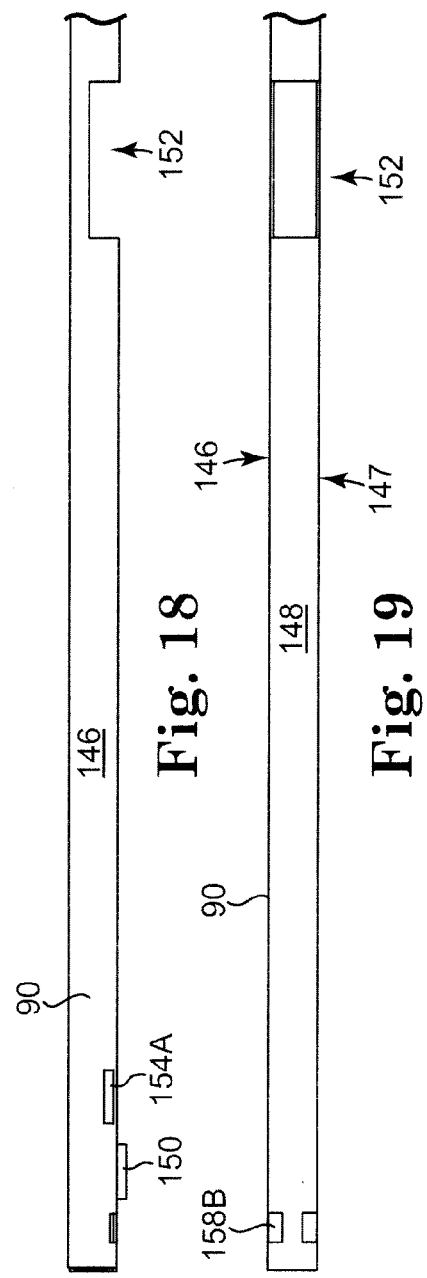

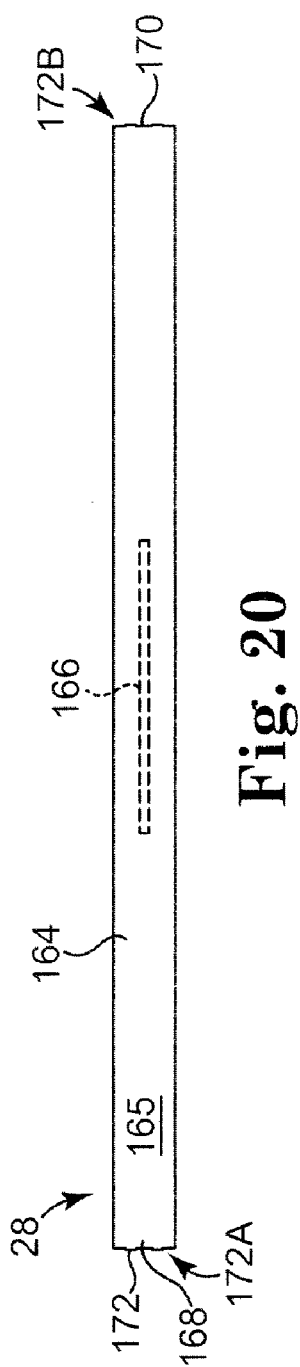
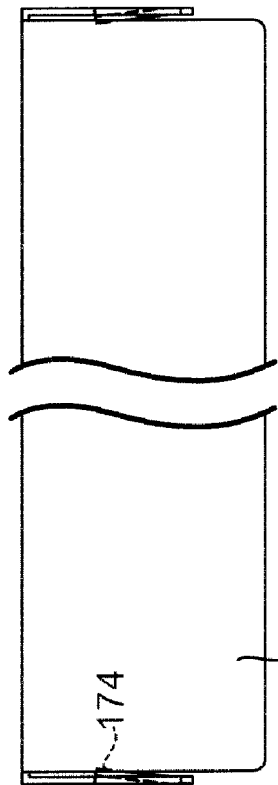
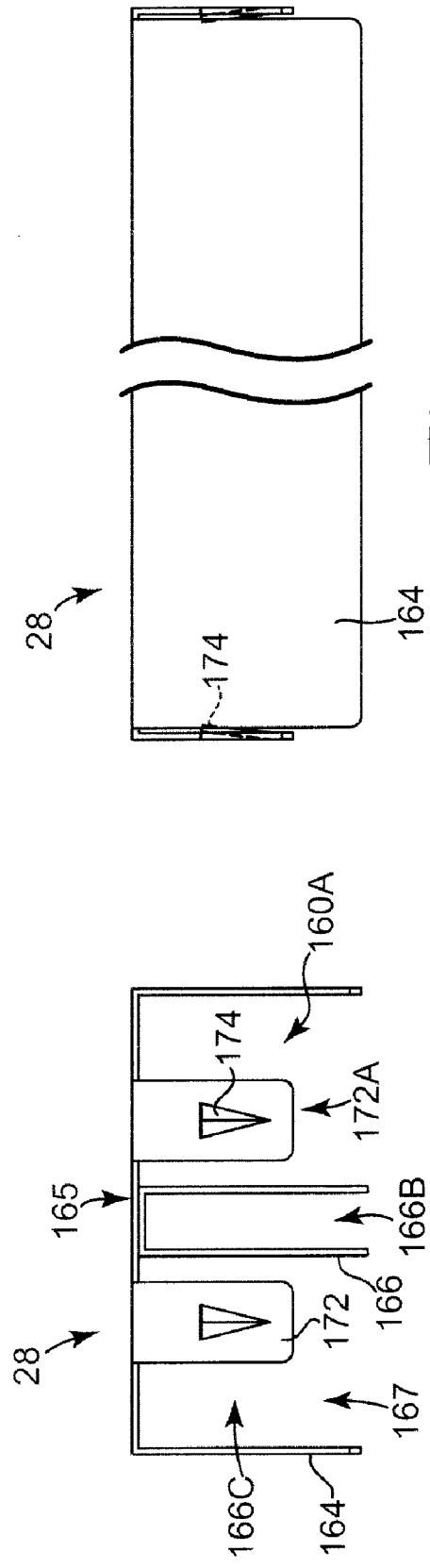

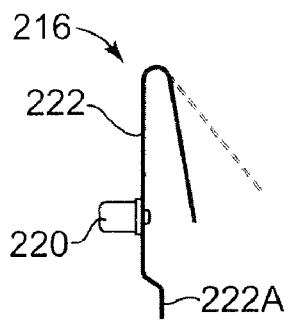
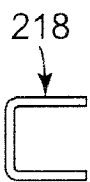
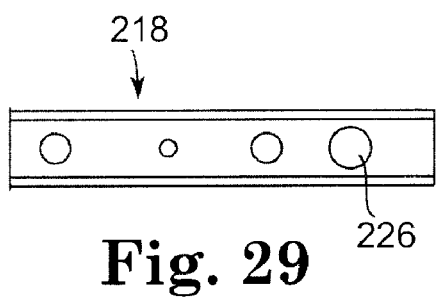
Fig. 27  Fig. 28  Fig. 29
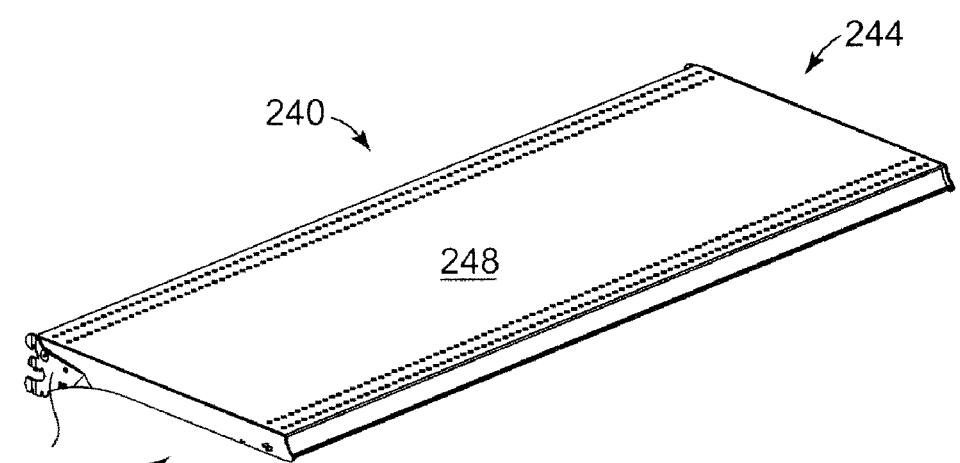
Fig. 30
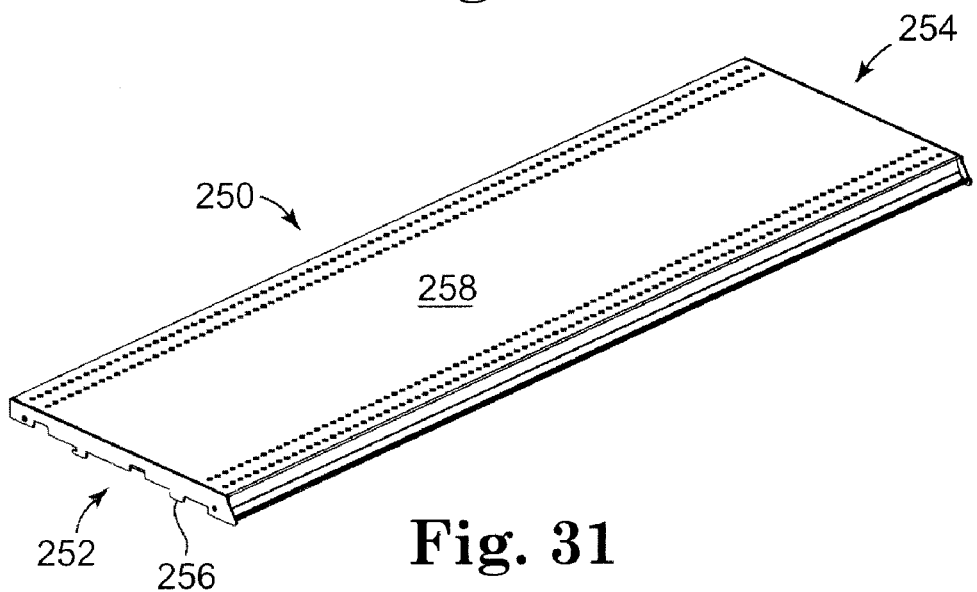
Fig. 31

US 8,028,846 B2

FLEXIBLE SHELVING SYSTEM

BACKGROUND

A variety of different types of product displays are used in retail environments. Shelving systems in the retailing industry often include removable or adjustable shelving to support and display products. Generally speaking, the merchandising of a product line, type of product, or product combination, for example, is enhanced through product displays that are aesthetically pleasing, easy to assemble and disassemble, and customizable to suit the display needs of a variety of retail environments and product combinations.

SUMMARY

Some aspects of various embodiments relate to assembly of a structurally sound modular shelving system including forming an H- or otherwise-shaped base structure by releasably hooking a tie beam into a mid-section of a first base piece and a mid-section of a second base piece, or at another location along either of the first and second base pieces. A first column member is slid into the first base piece by sliding an insert tab at an end of an elongate body of the first column member into a vertical passage through the mid-section of first base piece, or at another location along the first base piece. A second column member is similarly slid into a second base piece, or at another location along the second base piece. A header member is releasably hooked into the first and second column members, the header member extending substantially horizontally between the first and second column members and substantially perpendicularly to the first and second base pieces.

This summary is not intended to be limiting in nature. Various other aspects and embodiments are contemplated and should be understood with reference to the text and drawings that follow.

BRIEF DESCRIPTION OF THE DRAWINGS

FIGS. 6-8 show a tubular body of the first upright of FIGS. 3-5, according to some embodiments.

FIGS. 9-12 show an inner track member of the first upright of FIGS. 3-5, according to some embodiments.

FIGS. 16A-17B show a body portion of the first base leg of FIG. 15, according to some embodiments.

FIGS. 18-19 show a footing portion of the first base leg of FIG. 15, according to some embodiments.

FIGS. 20-22 show a top stretcher of the first base unit of FIG. 2, according to some embodiments.

FIG. 27 shows a spring button of the first end bracket of FIG. 26, according to some embodiments.

FIGS. 28 and 29 show a channel member of the first end bracket of FIG. 26, according to some embodiments.

FIG. 30 shows a shelf of the system of FIG. 1, according to some embodiments.

FIG. 31 shows a decking member of the system of FIG. 1, according to some embodiments.

Figure 1:
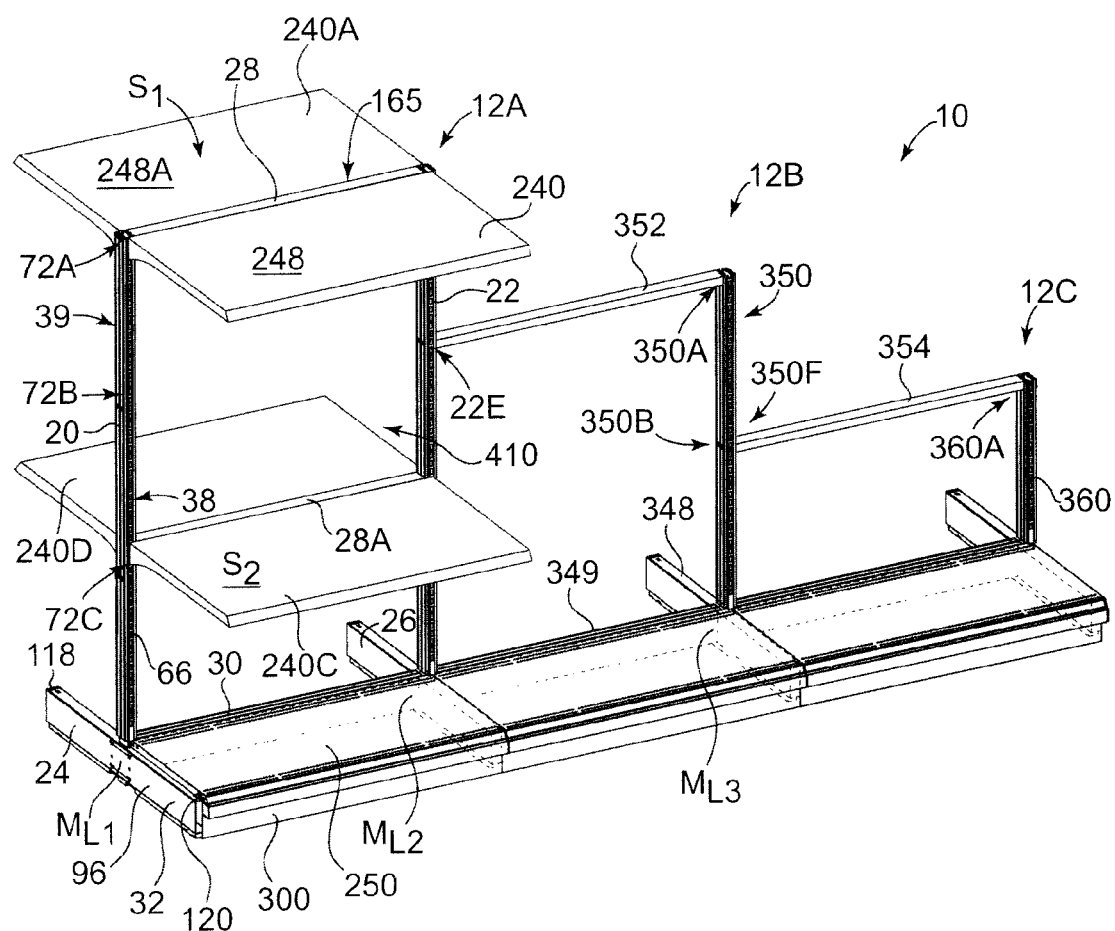
FIG. 1 is a perspective view of a shelving system, according to some embodiments.

Some embodiments have been shown by way of example in the drawings and are described in detail below. As stated above, the intention, however, is not to limit the invention by providing such examples.

DETAILED DESCRIPTION

In general terms, various embodiments address a versatile shelving system built on a six-piece base unit design that is adapted to provide versatility and allow relatively quick assembly and tear down, as well as being aesthetically pleasing. In some embodiments, the six pieces provide a structurally sound base structural unit which can be built upon to create more complex shelving designs. Although some embodiments incorporate the above-described features, additional and/or alternate features and combinations thereof are contemplated.

FIG. 1 is a perspective view of a modular shelving system 10, also described as a retail shelving unit or shelf unit, according to some embodiments. The shelving system 10 is formed of a plurality of base units 12, or base structural units, which optionally include a first base unit 12A, a second base unit 12B, and a third base unit 12C. Any number of base units 12 are contemplated, although three are shown to illustrate various features of the system 10. As shown, and as will be subsequently described, each of the base units 12 shares one or more components with an adjacent one of the base units 12, the additional base units 12 acting as add-on units to the first base unit 12A, each of the base units 12 being optionally provided with sufficient structural rigidity and support from the six-piece base unit design to support shelving and other retailing accessories, as well as retail products.

Figure 2:
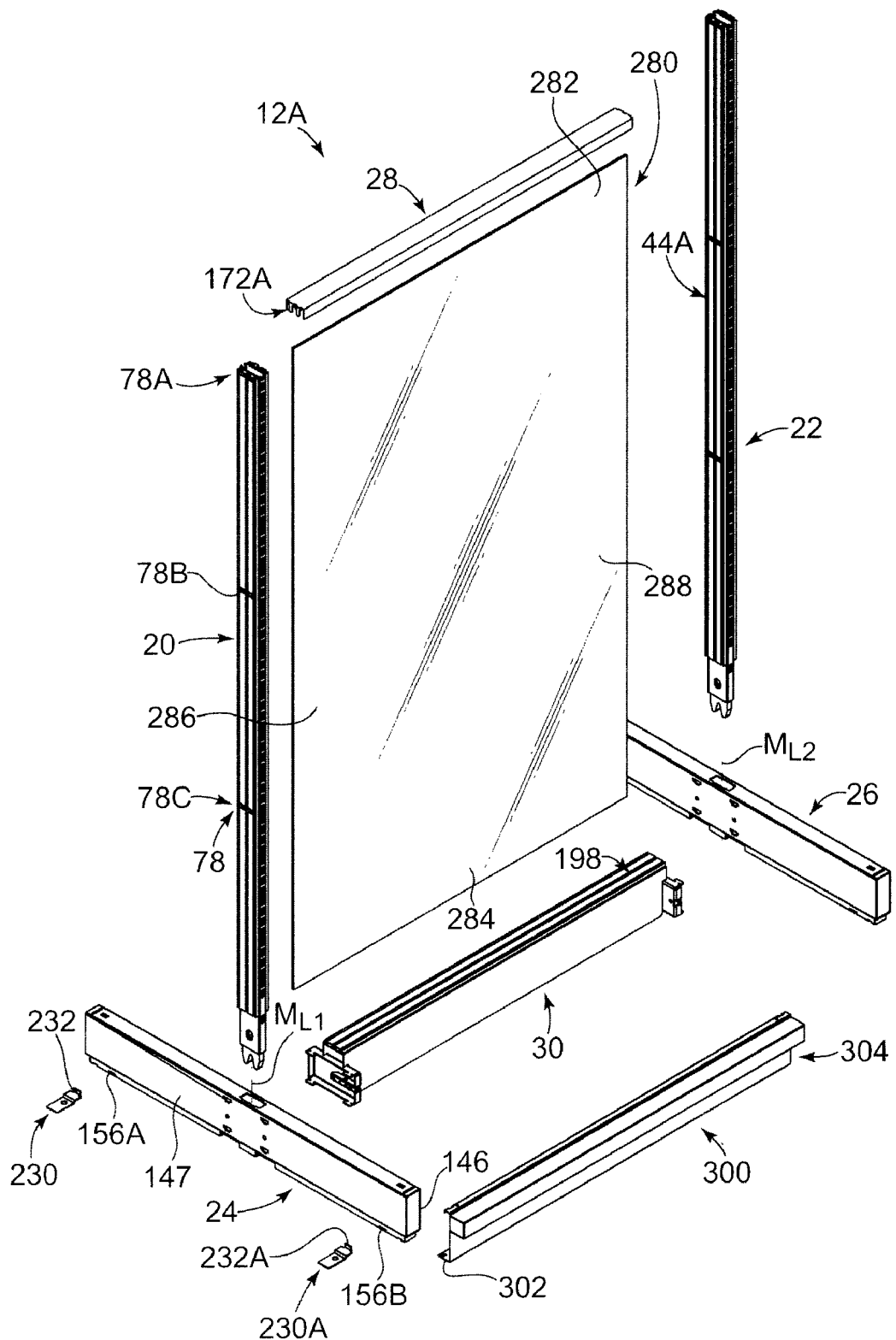
FIG. 2 is a perspective view of a disassembled first base unit of the shelving system of FIG. 1, according to some embodiments.

FIG. 2 is a perspective view of the first base unit 12A. Various features of the first base unit 12A are optionally similar to those of each of the plurality of base units 12. In some embodiments, the first base unit 12A is adapted to be structurally sound based upon a six piece design that includes a first upright 20, a second upright 22, a first base leg 24, a second base leg 26, a top stretcher 28, and a bottom stretcher 30. The bottom stretcher 30 is releasably secured into the first and second base legs 24, 26 to extend substantially horizontally between and tie the first and second base legs 24, 26 together to form an H-shaped base 32 (FIG. 1). The first and second uprights 20, 22 are releasably slid into the first and second base legs 24, 26, respectively, to hold the first and second uprights 20, 22 in a substantially upright fashion in which the uprights 20, 22 resist front-to-back movement (i.e., in a direction parallel to the longitudinal axis of the base legs 24, 26). The top stretcher 28 is releasably secured to the first and second uprights 20, 22, the top stretcher 28 spanning and extending substantially horizontally between the first and second uprights 20, 22 to resist lateral movement between the uprights 20, 22 (i.e., in a direction parallel to the longitudinal axes of the top and bottom stretchers 28, 30).

Figure 3:
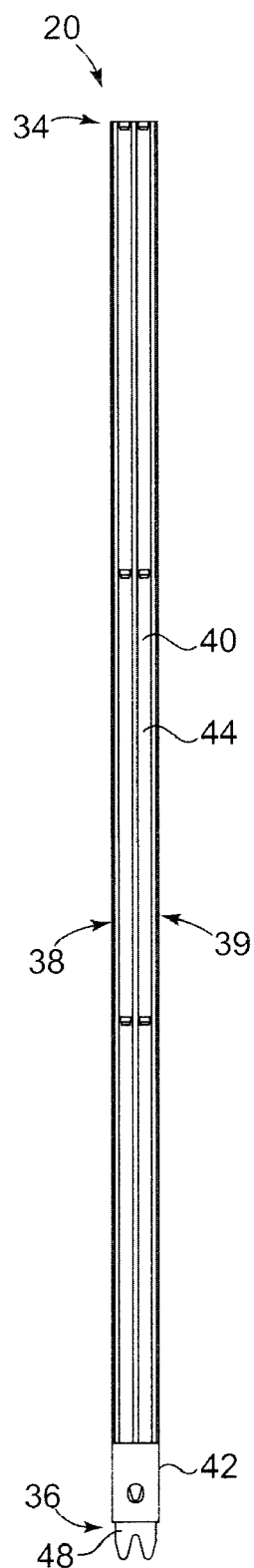
FIGS. 3-5 show a first upright of the first base unit of FIG. 2, according to some embodiments.
Figure 4:
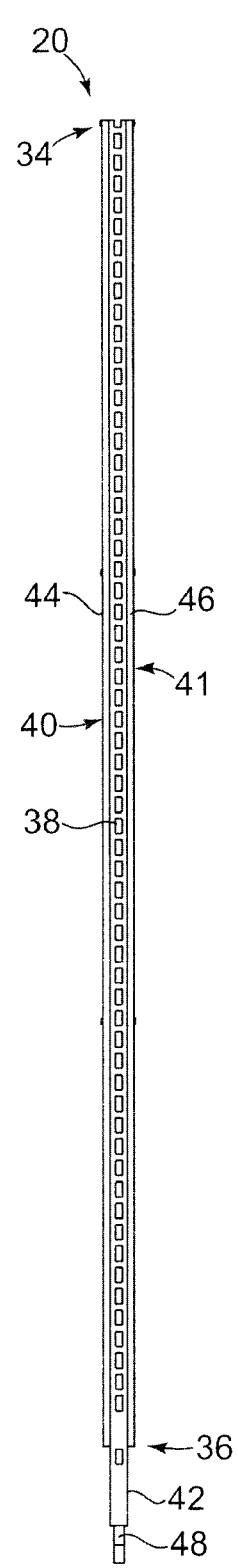
Figure 5:
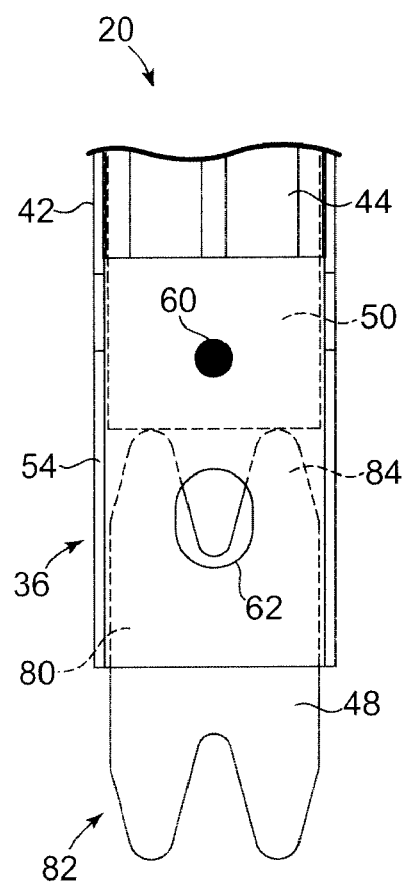

FIG. 3 shows the first upright 20 from a side view and FIG. 4 shows the first upright 20 from a front view. The first upright 20 and second upright 22 are optionally substantially similar and thus are both described with reference to the first upright 20, the first and second uprights 20, 22 also being described as column members or standards. The first upright 20 has a top end 34, a bottom end 36, a front 38, a back 39, an inside 40, and an outside 41 and optionally includes a tubular body 42, an inner track member 44 on the inside 40, an outer track member 46 on the outside 41, and a cleat 48. FIG. 5 is a close up of the first upright 20 toward the bottom end 36, where internal features are shown in broken lines. As shown in FIG. 5, the first upright 20 also optionally includes a weld plate 50 for securing the cleat 48 within the bottom end 36.

FIG. 6 is a side view of the tubular body 42, FIG. 7 is a top view of the tubular body 42, and FIG. 8 is a front view of the tubular body 42. The tubular body 42 is optionally formed of appropriate metals and plastics (e.g., 11 gauge steel or aluminum tubing). The tubular body 42 is hollow and has a top end 52, a bottom end 54, a weld hole 60, a view hole 62, a front set of attachment points 66 formed of a plurality of substantially vertically aligned and spaced apart holes 66A, and a rear set of attachment points 68 which are optionally substantially similar to the front set of attachment points 66. The front set of attachment points 66 and the rear set of attachment points 68 provide a plurality of vertical locations to secure one or more retailing accessories, as subsequently described.

FIG. 9 is a side view of the inner track member 44, FIG. 10 is a close up of area 10 designated in FIG. 9, FIG. 11 is a top view of the inner track member 44, and FIG. 12 is a cross-section taken along line 12-12 designated in FIG. 11. The inner track member 44 is optionally formed of appropriate metals and plastics (e.g., stamped and formed sheets of metal). The inner track member 44 and the outer track member 46 (FIG. 4) are optionally substantially similar and thus are both described with reference to the inner track member 44. As shown, the inner track member 44 forms a plurality of tracks 70, also described as channels, including front, middle, and rear tracks 70A, 70B, 70C, respectively. The inner track member 44 also forms a plurality of inner stretcher slots 72 for releasably securing the top stretcher 28 to the first upright 20. The stretcher slots 72 include first, second, and third sets of inner stretcher slots 72A, 72B, 72C, respectively, each of which is at a different vertical position along the inner track member 44. The sets of stretcher slots 72A, 72B, 72C are also referred to as upper, intermediate, and lower stretcher slots, respectively. All of the stretcher slots 72 are optionally substantially similar in design. As shown in FIGS. 10-12, each of the stretcher slots 72 includes an outer, raised collar 74 that is trapezoidal shaped and an inwardly bent guide flange 76. The outer track member 46 (FIG. 4) similarly includes a plurality of outer stretcher slots 78 (FIG. 2) at similar vertical positions to the inner stretcher slots 72.

Figure 13:
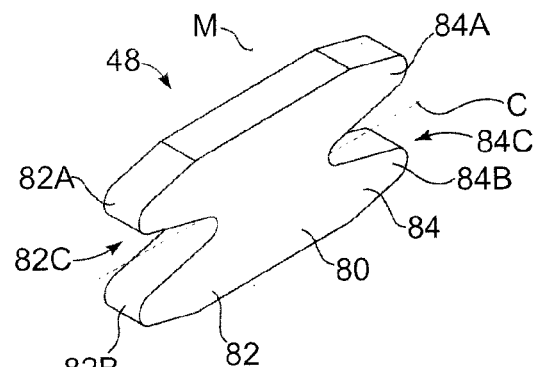
FIGS. 13 and 14 show a cleat of the first upright of FIGS. 3-5, according to some embodiments.
Figure 14:
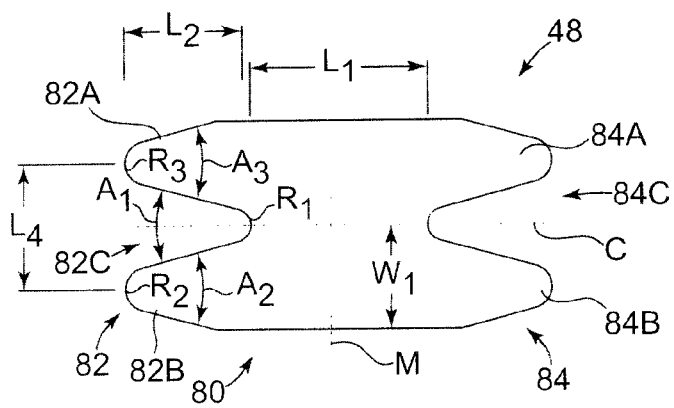

FIG. 13 is a perspective view of the cleat 48 and FIG. 14 is a side view of the cleat 48, the cleat 48 also being described as a sliding prong or an insert tab. As shown in FIG. 13, the cleat 48 is optionally monolithically formed of suitable plastic and metal materials (e.g., ⅝ inch plate steel rated for a minimum yield strength of 50 ksi) and includes a base portion 80, a nose portion 82, and a head portion 84. Each of the nose and head portions 82, 84 are substantially narrowed and have a substantially smooth, linear taper (e.g., at an angle of from about 15 to about 45 degrees, for example) relative to the base portion 80. The cleat 48 defines a centerline C and a midline M and is optionally substantially symmetrical about the centerline C and midline M.

As shown in FIG. 14, the nose portion 82 is optionally forked to form a first spur 82A and a second spur 82B with a mouth 82C formed therebetween. The head portion 84 is optionally of similar dimensions to the nose portion 82 and is forked to form a first spur 84A and a second spur 84B with a mouth 84C formed therebetween.

In some embodiments, the mouth 82C defines an angle $A_1$ of about 30 degrees and is rounded to a radius of curvature $R_1$ of about 0.19 inches, the first spur 82A defines an angle $A_2$ of about 30 degrees and is rounded to a radius of curvature $R_2$ of about 0.25 inches, and the second spur 82B defines an angle $A_3$ of about 30 degrees and is rounded to a radius of curvature $R_3$ of about 0.25 inches. As shown, the mouths 82C, 84C are spaced a distance $L_1$ of about 2.0 inches, the first and second spurs 82A, 82B are each a length $L_2$ of about 1.4 inches, the first and second spurs 82A, 82B are spaced a distance $L_4$ from one another of about 1.4 inches, and the width $W_1$ of the base portion 80 from the midline M is about 1.2 inches. Other dimensions are also contemplated.

As shown in FIGS. 3-5, the first upright 20 is assembled by securing the inner and outer track members 44, 46 on each side of the tubular body 42. The cleat 48 is received and secured in the tubular body 42. For example, by inserting the weld plate 50 into the bottom end 54 of the tubular body 42 and welding the base portion 80 of the cleat 42 into the bottom end 54 of the tubular body 42 using the weld hole 60 and/or the view hole 62 as necessary.

Figure 15:
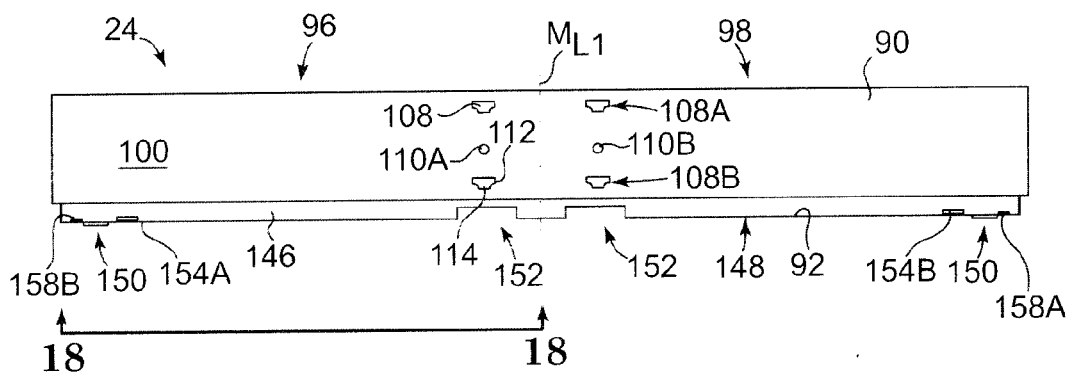
FIG. 15 shows a first base leg of the first base unit of FIG. 2, according to some embodiments.

FIG. 15 is a side view of the first base leg 24, also described as a first rail, a first footing, or a first base piece. The first base leg 24 is optionally formed of appropriate metals and plastics (e.g., stamped and formed sheets of metal). The first base leg 24 and the second base leg 26 (FIG. 2), also described as a second rail or a second footing, are optionally substantially similar and thus are both described with reference to the first base leg 24. As shown, the first base leg 24 optionally includes a body portion 90 and a footing portion 92 secured under the body portion 90 (e.g., by welding).

FIG. 16A is a top view of the body portion 90 and FIG. 17A is a bottom view of the body portion 90. The body portion 90 has a longitudinal midpoint $M_{L1}$ dividing the first base leg 24 at its midsection into a front portion 96 and a rear portion 98, is substantially elongate, and includes a first side 100 (also described as an inner side), a second side 102 (also described as an outer side), a top 104, and a bottom 106. The first and second sides 100, 102 of the body portion 90 are optionally substantially similar and thus are both described with reference to the first side 100. As shown in FIG. 15, the first side 100 has a plurality of keyholes 108, a first locking button hole 110A, and a second locking button hole 110B. The plurality of keyholes 108, also described as insert holes, include an upper pair of keyholes 108A and a lower pair of keyholes 108B. Each of the plurality of keyholes 108 includes an upper, widened portion 112 and a lower, narrowed portion 114. As shown, the widened portion 112 optionally arcuately tapers into the narrowed portion 114.

As shown in FIG. 16A, the top 104 of the body portion 90 optionally has a front bumper slot 116, a back bumper slot 118, a front guide hole 120, a back guide hole 122, and an upper cleat hole 124. Each of the slots 116, 118 and guide holes 120, 122 is optionally substantially rectangular and oriented as shown.

The upper cleat hole 124 is shown in greater detail in FIG. 16B. As shown, the upper cleat hole 124 optionally includes a middle portion 126, a first end portion 128, and a second end portion 130, where each of the first and second end portions 128, 130 is substantially narrower than the middle portion 126 and the upper cleat hole 124 is substantially symmetrical about a centerline $C_{10}$ and midline $M_{10}$. The first and second end portions 128, 130 transition smoothly in width to the middle portion 126. In some embodiments, the middle portion 126 has a width $W_{10}$ of about 1 inch and a length $L_{10}$ of about 1.7 inches and the first and second end portions 128, 130 each have a width $W_{12}$ of about 1.2 inches and a length L12 of about 0.4 inches, although other dimensions are contemplated.

FIG. 17A is a bottom view of the body portion 90. As shown, the bottom 106 has a lower cleat hole 134 (shown in greater detail in FIG. 17B) including a first portion 136 and a second portion 138, where each of the first and second portions 136, 138 are distinct and separate from one another, as well as being substantially similar and symmetrical to one another relative to midline $M_{20}$. Each of the first and second portions 136, 138 defines a leading edge 136A, 138A and a trailing edge 136B, 138B, respectively. By splitting the lower cleat hole 134 into multiple portions (e.g., two portions as shown), the total number of leading and trailing edges of the lower cleat hole 134 is increased. As will be subsequently described, increasing the total number of leading and trailing edges helps improve the number of contact points between the first upright 20 (FIG. 2) and the first base leg 24, thereby helping to improve resistance to bending movement of the first upright 20 in a direction parallel to the longitudinal axis of the first base leg 24.

The first and second portions 136, 138 are symmetrical about centerline $C_{20}$, are spaced a length $L_{20}$ of about 0.6 inches from one another, have a length $L_{22}$ of about 0.8 inches, and each have a middle, widened portion 140, a narrowed, first end portion 142, and a narrowed, second end portion 144. The middle widened portions 140 each have a radius of curvature $R_{20}$ of about 0.5 inches, a length $L_{24}$ of about 0.5 inches, and a width $W_{20}$ of about 0.8 inches. The narrowed first and second end portions 142, 144 are substantially similar to one another, each having a width $W_{22}$ of about 0.6 inches and a length $L_{26}$ of about 0.3 inches. Other dimensions are also contemplated.

As shown in FIG. 15, the footing portion 92 has a first side 146, a second side 147 (FIG. 19), a top (not shown), and a bottom 148 (FIG. 19). FIG. 18 is a side view of a section of the footing portion 92 taken along line 18-18 designated in FIG. 15. FIG. 19 is a bottom view of the section of the footing portion 92 shown in FIG. 18. The first side 146 and second side 147 of the footing portion 92 are optionally substantially similar and thus are both described with reference to the first side 146. By referring among FIGS. 15, 18, and 19, it will be understood that the footing portion 92 includes a pair of feet 150, which are optionally plastic inserts for protecting the footing portion 92 from a surface on which it is resting and vice versa. The footing portion 92 includes a pair of accessory channels 152 which are formed into the bottom 148 of the footing portion 92, extending from the first side 146 to the second side 147. The accessory channels 152 provide a space for cords and wires, for example, to be passed under the first base leg 24. The footing portion 92 also has a first rear retaining hole 154A and a first front retaining hole 154B extending partially into the bottom 148 of the footing portion 92 from the first side 146. A second rear retaining hole 156A (FIG. 2) and a second front retaining hole 156B (FIG. 2) similarly extend partially into the bottom 148 of the footing portion 92 from the second side 147. The first side 146 includes a front anchor slot 158A and a rear anchor slot 158B, with the second side 147 including similar anchor slots.

FIG. 20 is a top view of the top stretcher 28, FIG. 21 is a side view of the top stretcher 28, and FIG. 22 is a front view of the top stretcher 28. The top stretcher 28, also described as an upright spanner, a crossbar, or a header member, is optionally formed of appropriate metal and plastics (e.g., stamped and formed sheets of metal). As shown in FIG. 20, the top stretcher 28 includes a main body 164 and a center channel 166 (shown in broken lines in FIG. 20). The main body 164, also described as a span portion, is substantially U-shaped in transverse cross-section and has a top side 165, a bottom side 167, a first end 168, and a second end 170. As shown in FIGS. 21 and 22, the top stretcher 28 also includes a plurality of prongs 172, the plurality of prongs 172 also being described as hook-shaped retainers and including first pair of spaced apart prongs 172A (also referred to as a first end bracket) at the first end 168 and a second pair of spaced apart prongs 172B (also referred to as a second end bracket) at the second end 170. As shown in FIG. 21, each one of the prongs 172 is substantially L- or hook-shaped with the main body 164 and includes a inwardly projecting feature 174 (shown partially in broken lines in FIG. 22).

The center channel 166, also referred to as a top channel, is substantially U-shaped in transverse cross-section and is centrally received and secured to the bottom side 167 of, and within the main body 164. The center channel 166 defines a front channel 166A, or track, with the main body 164, a middle channel 166B with the main body 164, and a rear channel 166C with the main body 164. As will be subsequently described, the center channel 166 helps the top stretcher 28 receive one or more pieces of backer board material, for example.

Figure 23:
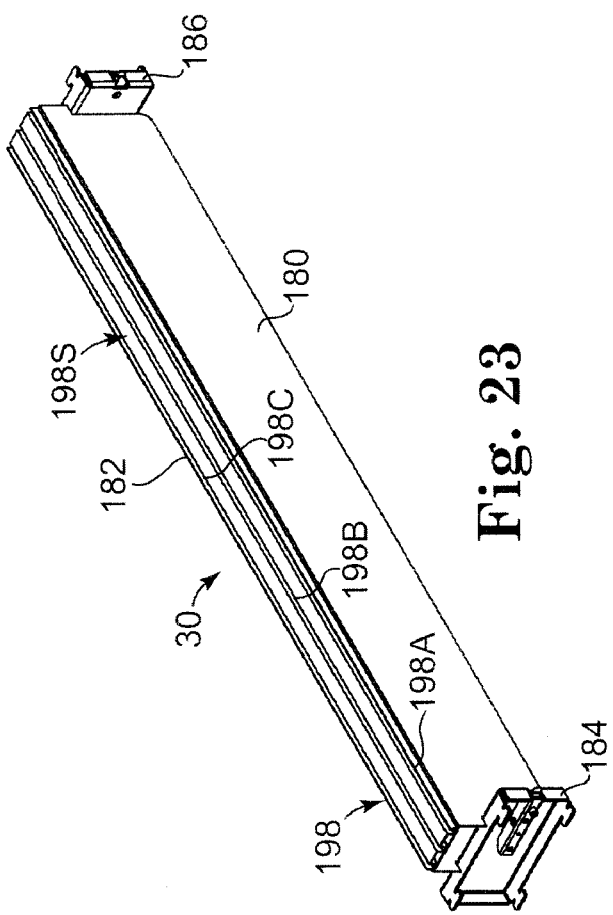

FIG. 23 is a perspective view of the bottom stretcher 30, also described as a rail spanner or a tie beam. As shown, the bottom stretcher 30 includes a main body 180, an upper track member 182, a first end bracket 184, and a second end bracket 186. The main body 180 and the upper track member 182 combine to form an intermediate portion 180, 182 of the bottom stretcher 30. The bottom stretcher 30 is optionally formed of appropriate metals and plastics (e.g., stamped and formed sheets of metal).

Figure 24:
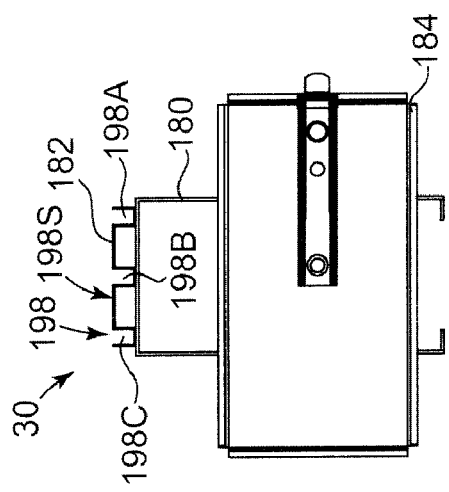
FIGS. 23-25 show a bottom stretcher of the first base unit of FIG. 2, according to some embodiments.
Figure 25:
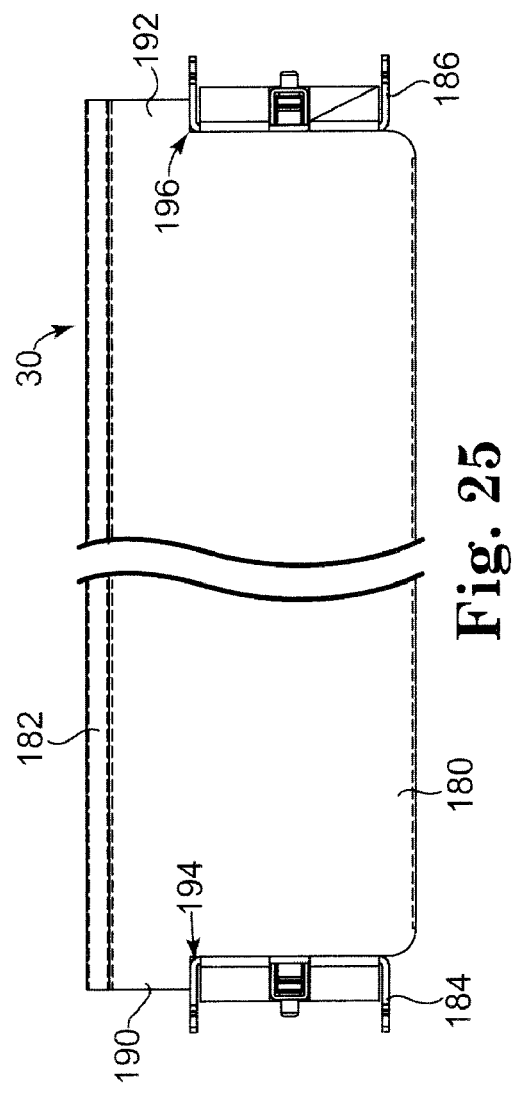

FIG. 24 is an end view of the bottom stretcher 30. As best seen in FIG. 24, the main body 180 is hollow and substantially U-shaped in transverse cross-section. In some embodiments, the hollow, U-shaped configuration helps improve bending strength while minimizing overall weight. FIG. 25 is a shortened view of the bottom stretcher 30. As shown in FIG. 25, the main body 180 has a first end 190 and a second end 192 and forms a first recess 194 and a second recess 196 at the first and second ends 190, 192, respectively.

The upper track member 182 is optionally formed of appropriate metals and plastics (e.g., stamped and formed sheets of metal). As shown in FIGS. 23-25, the upper track member 182 is secured to the top of the main body 180 (e.g., by welding). The upper track member 182 forms a plurality of tracks 198 (FIGS. 23 and 24), also described as channels, including front, middle, and rear tracks 198A, 198B, 198C, respectively. The upper track member 182 generally defines an upper support surface 198S with the front, middle, and rear tracks 198A, 198B, 198C being formed into the upper support surface 198S.

As shown in FIGS. 23 and 25, the first end bracket 184, also described as a first retaining claw, is secured in the first recess 194 (e.g., by welding) to connect the first end bracket 184 and the intermediate portion 180, 182 and the second end bracket 186 is secured in the second recess 196 (e.g., by welding) to connect the second end bracket 186 and the intermediate portion 180, 182. The first and second end brackets 184, 186 are optionally substantially similar and thus are both described with reference to the first end bracket 184.

Figure 26:
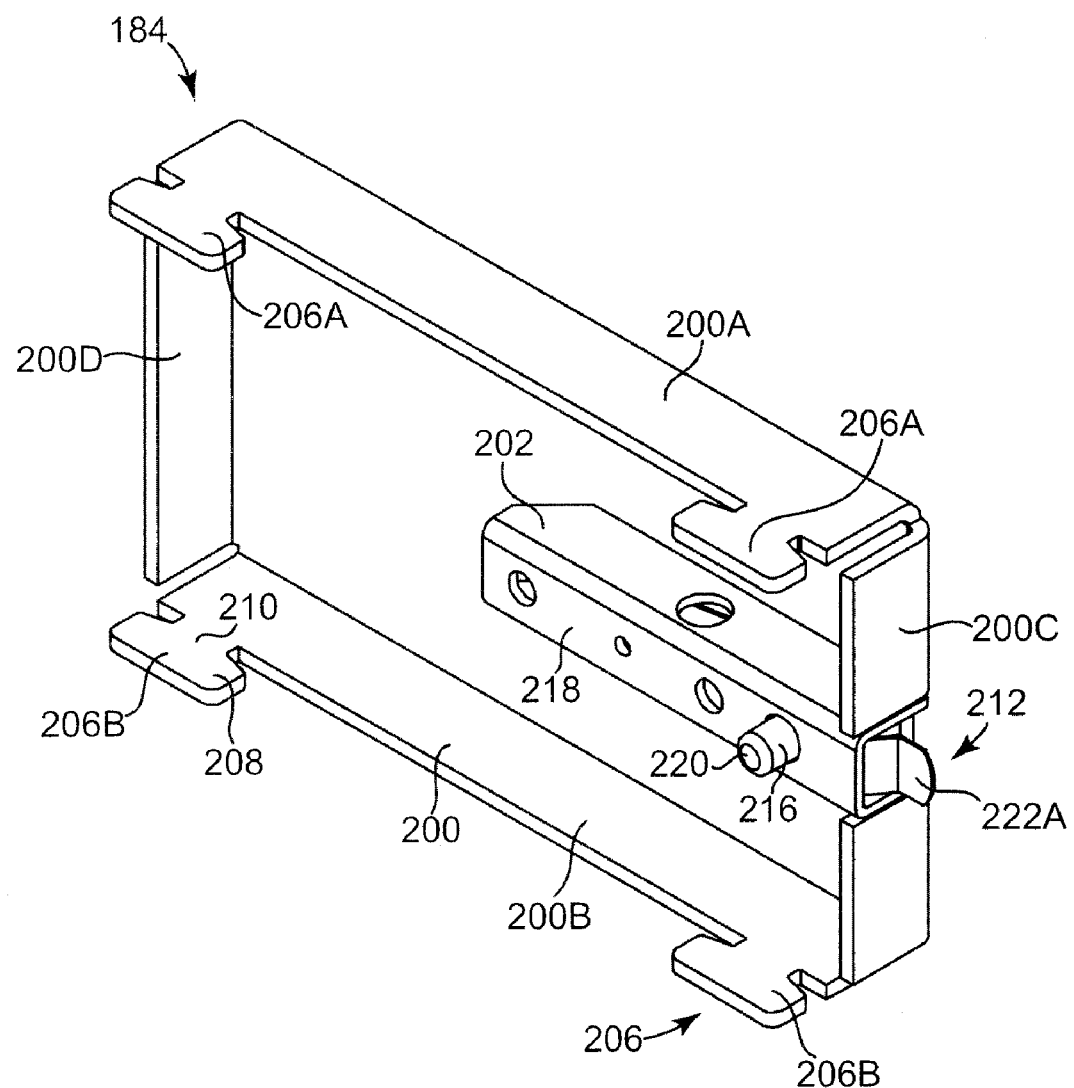
FIG. 26 shows a first end bracket of the bottom stretcher of FIGS. 23-25, according to some embodiments.

FIG. 26 is a perspective view of the first end bracket 184. The first end bracket 184 is optionally formed of suitable metals and plastics (e.g., stamped and formed sheets of metal). As shown, the first end bracket 184 includes a box-like body 200 and a lock assembly 202. The body 200 has a top flange 200A, a bottom flange 200B, a front flange 200C, and a back flange 200D. As will be understood in greater detail, the flanges 200A, 200B, 200C, 200D help mask the lock assembly 202 from view when in use. The top and bottom flanges 200A, 200B each have a plurality of ears 206, with the top flange 200A forming a top pair of ears 206A and the bottom flange 200B forming a bottom pair of ears 206B. Each one of the ears 206, also described as insert tabs or mushroom-shaped retainers, has a widened head portion 208, also described as cap portions, and a narrowed neck portion 210, also described as base portions. The front flange 200C also has a lock cut-out 212 for receiving a portion of the lock assembly 202.

The lock assembly 202 includes a spring button 216 and a channel member 218. The spring button 216 is shown by itself in FIG. 27, the spring button 216 including a button 220 secured to a spring 222 (e.g., a leaf spring), the spring 222 having a lever portion 222A for grasping. For reference, the dotted lines in FIG. 27 show the spring 222 in a relaxed or extended state.

The channel member 218 is shown from a front view in FIG. 28 and an inside view in FIG. 29. As shown in FIG. 28, the channel member 218 is optionally substantially U-shaped in transverse cross-section. As shown in FIG. 29, the channel member 218 includes a button hole 226 for receiving the button 220 upon assembly of the lock assembly 202. In particular, as shown in FIG. 26, the channel member 218 is secured to the body 200 and the spring button 216 is loaded into the channel member 218 such that the button 220 is received in the button hole 226 and the lever portion 222A is received in the lock cut-out 212 in the front flange 200C, the lever portion 222A being depressible to actuate the button 220 within the button hole 226.

FIG. 30 is a perspective view of a shelf 240, also described as a shelving member or shelving piece, that is adapted to be used with the base units 12. The shelf 240 is optionally one of those available from Streater Inc., headquartered in Albert Lea, Minn. The shelf 240 optionally has a first side 242 and a second side 244 and includes a first bracket 246 at the first side 242 and a second bracket (not shown) at the second side 244, as well as a substantially planar upper support surface 248. The first bracket 246 and the second bracket are optionally substantially similar and are also described as attachment brackets as desired.

FIG. 31 is a perspective view of a decking member 250 adapted to be used with the base units 12. The decking member 250 is optionally one of those available from Streater Inc., headquartered in Albert Lea, Minn. The decking member 250 has a first side 252 and a second side 254 and optionally includes a first tab 256 at the first side 252 and a second tab (not shown) at the second side 254, the second tab being substantially similar to the first tab 256. The decking member 250 also has a substantially planar upper support surface 258.

Figure 32:
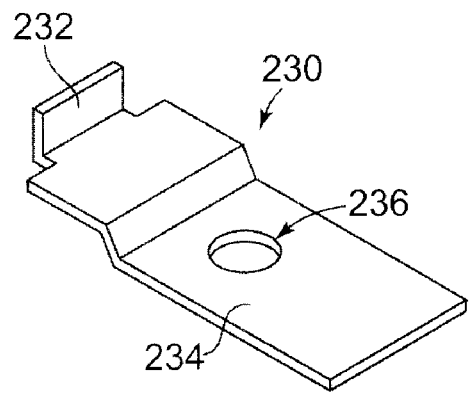
FIG. 32 shows a floor anchor of the system of FIG. 1, according to some embodiments.

FIG. 32 is a perspective view of a floor anchor 230 adapted for use with the base units 12. The floor anchor 230 has a bent finger 232 that extends from a body 234 with a rivet hole 236 in the body 234.

Figure 33:
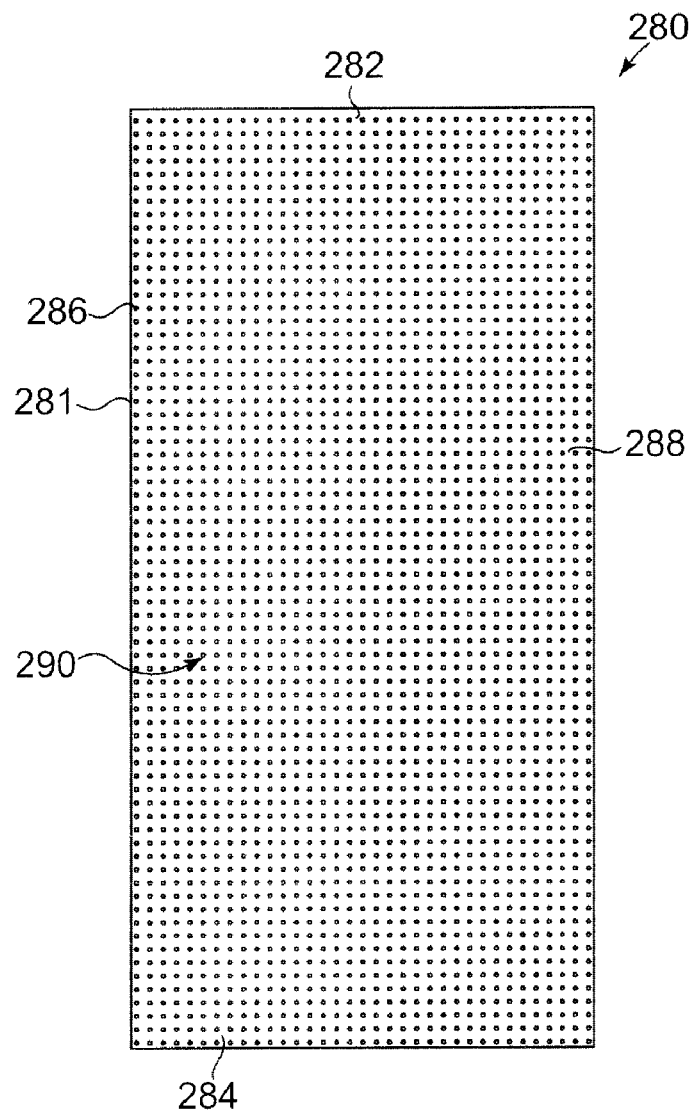
FIG. 33 shows a backer board of the system of FIG. 1, according to some embodiments.

FIG. 33 is a perspective view of a backer board 280, for example pegboard material, adapted for use with the base units 12. The backer board 280 is optionally any of a variety of materials (e.g., clear plastics, plastics, cardboards, woods, etc.) and has an outer perimeter 281 that includes a top edge 282, a bottom edge 284, a first side edge 286, a second side edge 288, a front 290 and a back (not shown). The backer board 280 is optionally used to display indicia, as a securing surface, for decorative effect, or for other purposes.

Figure 34:
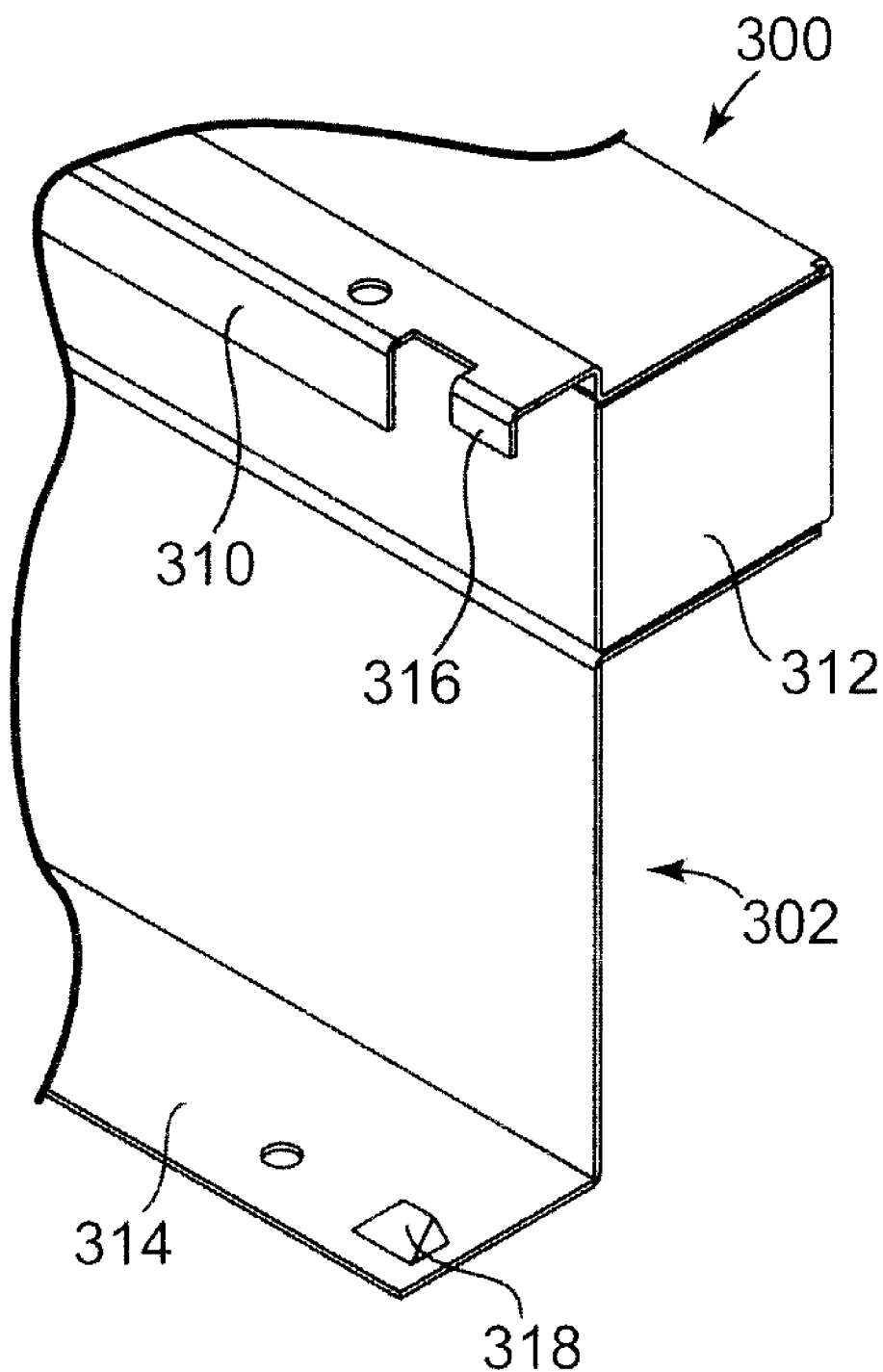
FIG. 34 shows a bumper member of the system of FIG. 1, according to some embodiments.

FIG. 34 is a perspective view of one end of a bumper member 300 adapted for use with the base units 12. The full length of the bumper member 300 is shown in FIG. 2, the bumper member 300 having a first end portion 302 and a second end portion 304. FIG. 34 shows the first end portion 302 in greater detail, where the first and second end portions 302, 304 are optionally substantially similar and thus are both described with reference to the first end portion 302. As shown in FIG. 34, the first end portion 302 includes an upper lip 310, a bumper portion 312, and a lower lip 314. The upper lip 310 forms a retaining finger 316 and the lower lip 314 forms a locking ramp 318. The upper and lower lips 310, 314 are adapted to be flexed away from one another to encourage a locking action with the first base leg 24 that will be subsequently described.

FIGS. 35-40 are illustrative of some methods of assembling the first base unit 12A shown in FIGS. 1 and 2. In particular, some methods of assembling the first base unit 12A include placing the first base leg 24 on a surface (not shown), such as a retail floor. The bottom stretcher 30 is oriented substantially perpendicular to the first base leg 24, with the first end bracket 184 facing toward the first side 100 of the first base leg 24. The top and bottom pairs of ears 206A, 206B of the first end bracket 184 are inserted into the upper and lower pairs of keyholes 108A, 108B, respectively, of the first base leg 24 as designated by the broken lines in FIG. 35A. In particular, the head portions 208 of the ears 206 are inserted into the upper, widened portions 112 of the keyholes 108 and the first end bracket 184 is then lowered such that the neck portions 210 of the ears 206 are received in the lower, narrowed portions 114 of the keyholes 108 firmly securing the first end bracket 184 and the first base leg 24 together.

Figure 35A:
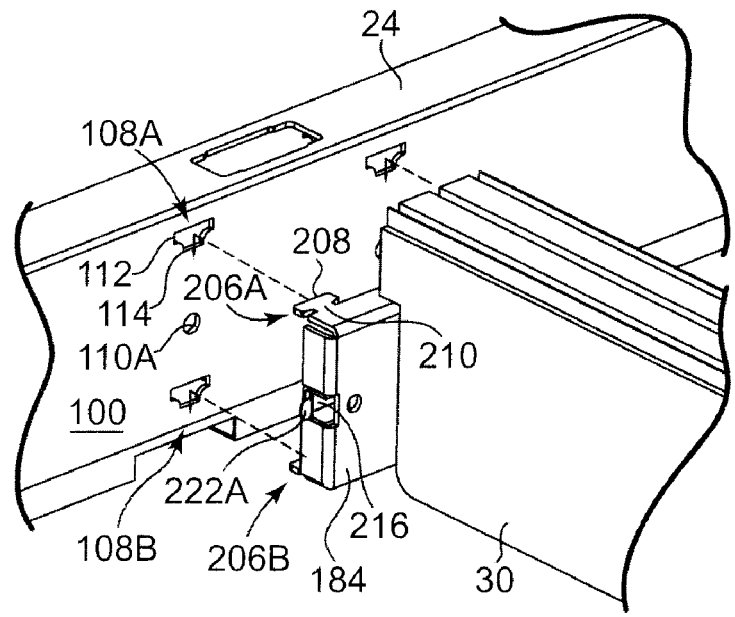
FIGS. 35A and 35B are illustrative of an assembly of the bottom stretcher of FIGS. 23-25 and the first base leg of FIG. 15, according to some embodiments.
Figure 35B:
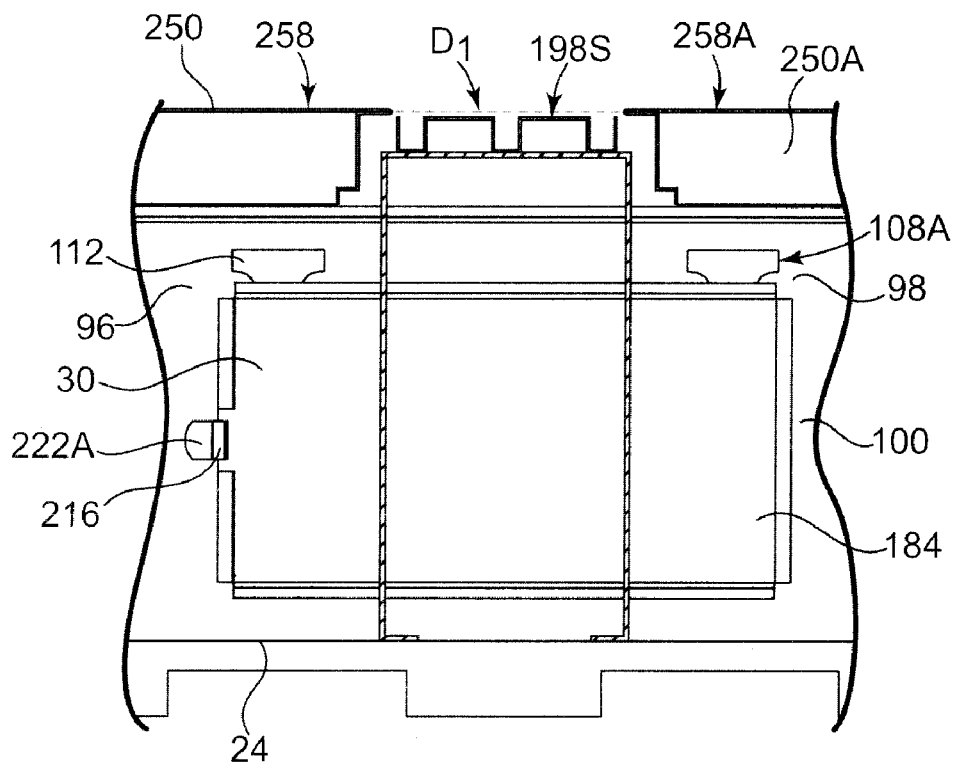

FIG. 35A is a perspective view and FIG. 35B is a cross-sectional view through the bottom stretcher 30 showing assembly of the first base leg 24 and bottom stretcher 30. With reference between FIGS. 35A and 35B, it should be understood that as the first end bracket 184 engages the first side 100, the spring button 216 is depressed according to some embodiments. Once the first bracket 184 is slid downwardly the spring button 216 is allowed to seat in the first locking button hole 110A. In this manner, the first base leg 24 and the bottom stretcher 30 are adapted to be releasably locked together. In order to release the bottom stretcher 30 from the first base leg 24, the spring button 216 is depressed by depressing the spring lever portion 222A.

A substantially similar process is used to assemble and releasably lock the bottom stretcher 30 to the second base leg 26 (FIG. 2). As shown in FIG. 1, upon assembly, the first base leg 24, the second base leg 26, and the bottom stretcher 30 form the substantially H-shaped base 32 with the first and second base legs 24, 26 being oriented substantially parallel to one another and laterally offset from one another and the bottom stretcher 30 being releasably secured proximate the longitudinal midpoint $M_{L1}$ of the first base leg 24 and a longitudinal midpoint $M_{L2}$ of the second base leg 26. Additionally, as best seen in FIG. 35B, the upper support surface 198S of the bottom stretcher 30 extends above the first base leg 24 (as well as the second base leg 26), which helps provide a substantially continuous support surface according to some embodiments and as will be subsequently described.

Figure 36:
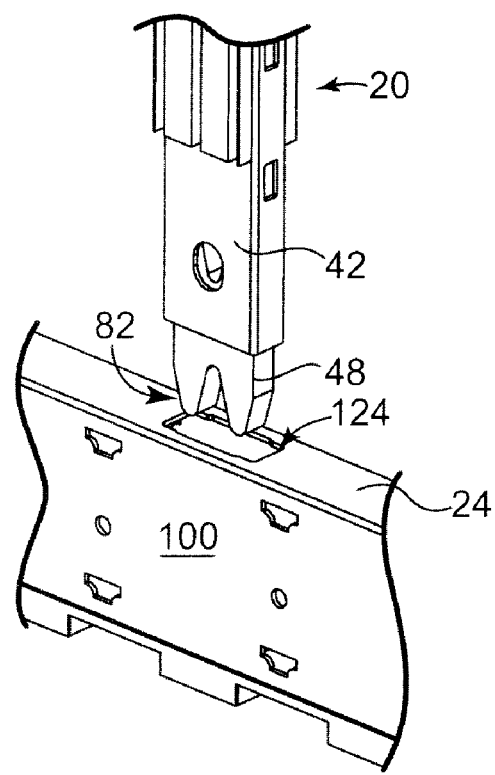
FIGS. 36-38 are illustrative of an assembly of the first upright of FIGS. 3-5 and the first base leg of FIG. 15, according to some embodiments.
Figure 37:
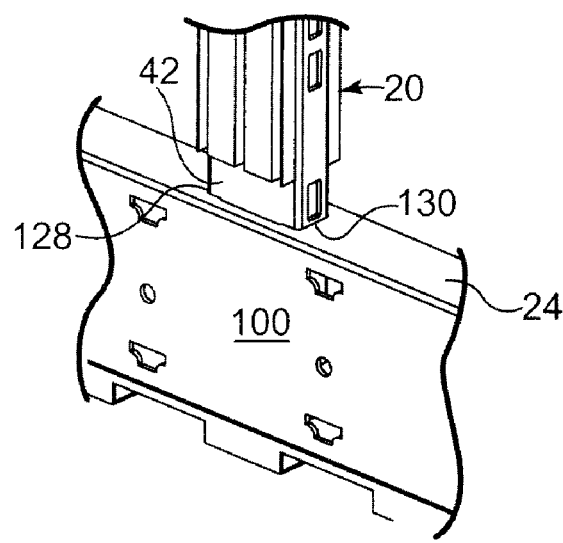

As shown in FIG. 36, the first upright 20 is grasped and the cleat 48 of the first upright 20 is then inserted, or slid, into the upper cleat hole 124 in the first base leg 24 proximate the longitudinal midpoint $M_{L1}$ at the midsection of the first base leg 24 until the nose portion 82 is received in the lower cleat hole 134 (FIG. 17A). The widened, middle portion 126 (FIG. 16A) of the upper cleat hole 124 helps center the tubular body 42 of the first upright 20 in the upper cleat hole 124 during insertion, thereby facilitating smooth, repeatable insertion. As shown in FIG. 37, during insertion the tubular body 42 ultimately engages the first and second end portions 128, 130 which help ensure a snug fit and decrease an amount of slop or play between the tubular body 42 and the first base leg 24. In some embodiments, the snug fit helps ensure that the first upright is substantially rigidly vertically standing and structurally sound upon full assembly of the first base unit 12A.

Figure 38:
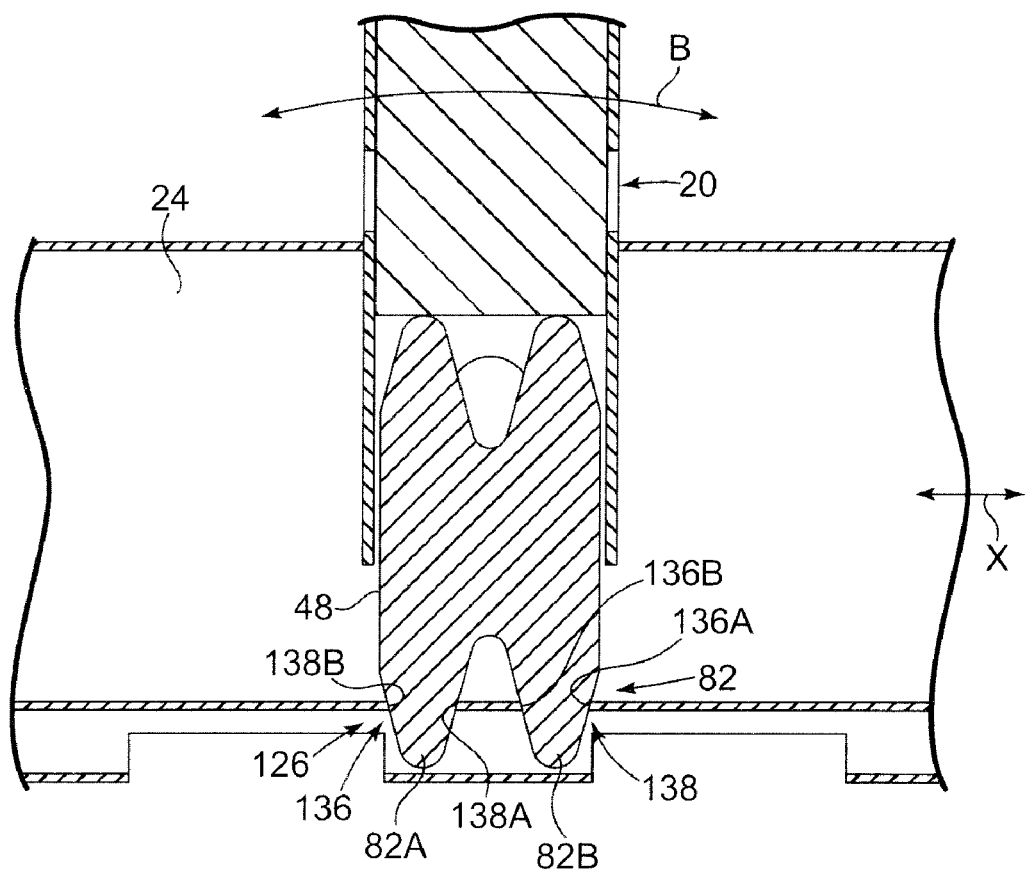

FIG. 38 is a cross-sectional view showing an interaction between the cleat 48 and the lower cleat hole 134 (FIG. 17A). As shown, the nose portion 82 is received in the lower cleat hole 134 with the first spur 82A and the second spur 82B being disposed in the first and second portions 136, 138, respectively, of the lower cleat hole 134. As previously referenced, the first and second spurs 82A, 82B engage the leading and trailing edges 136A, 138A, 136B, 138B of the first and second portions 136, 138 of the lower cleat hole 134. The tapering, divided configuration of the nose portion 82 serves to facilitate insertion of the first and second spurs 82 into the first and second portions 136, 138 of the lower cleat hole 134. The tapered, divided configuration also increases the contact area between the nose portion 82 and the lower cleat hole 134 in a direction perpendicular to the longitudinal axis of the first base leg 24, thereby helping improve resistance to bending along a direction B that is substantially parallel to a direction X extending with the longitudinal axis of the first base leg 24.

After insertion, the first upright 20 is releasably retained and supported in a substantially upright, or vertical, position by the first base leg 24 where the first upright 20 is substantially perpendicular to the first base leg 24. The second upright 22 is optionally similarly inserted into and releasably retained by the second base leg 26 proximate the midpoint $M_{L2}$ (FIG. 2) whereby the first and second uprights 20, 22 extend upwardly such that they are substantially aligned with one another, parallel, and laterally offset from one another.

Figure 39:
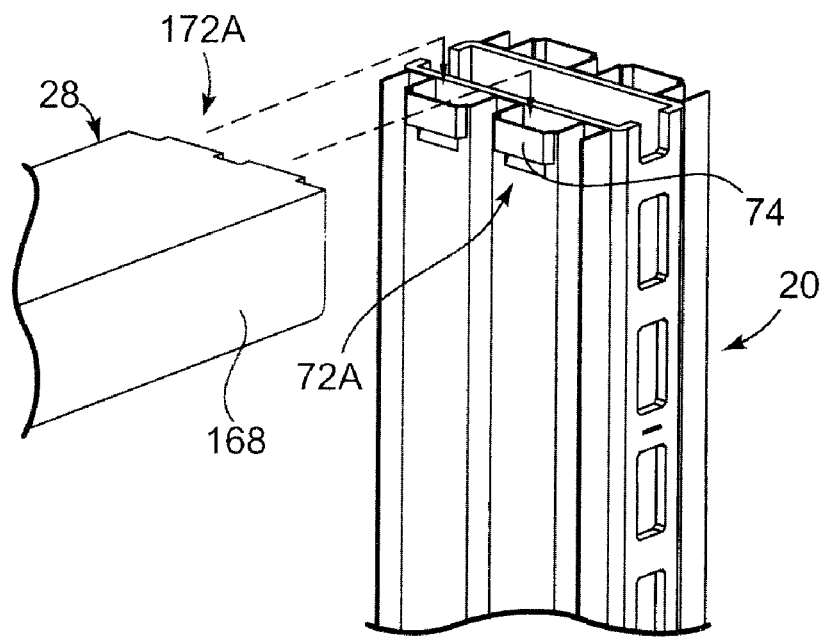
FIG. 39 is illustrative of an assembly of the first upright of FIGS. 3-5 and the top stretcher of FIGS. 20-22, according to some embodiments.

As shown in FIG. 39, the top stretcher 28 is secured to the first upright 20. In particular, the top stretcher 28 is secured into one of the first, second, and third sets of stretcher slots 72A, 72B, 72C (FIG. 9) and into a corresponding set of stretcher slots in the second upright 22. As shown in FIG. 39, the top stretcher 28 is releasably secured into the first set of stretcher slots 72A by inserting the first pair of spaced apart prongs 172A at the first end 168 into the raised collars 74 of the first set of stretcher slots 72A until the inwardly projecting features 174 (FIG. 12) on the prongs 172A pass beyond the collars 74 and click into place. In this manner, the inwardly projecting features 174 help releasably retain the top stretcher 28 to the first upright 20. The second pair of spaced apart prongs 172B (FIG. 20) at the second end 170 (FIG. 20) of the top stretcher 28 are then similarly releasably secured to the second upright 22 such that the top stretcher 28 extends substantially horizontally between, and perpendicularly to the first and second uprights 20, 22 and over and substantially parallel to the bottom stretcher 30 as shown in FIG. 1.

As previously referenced, a structurally sound, self-supporting structure (e.g., base unit 12A) is formed upon assembling together the six-components—the first and second uprights 20, 22, the first and second base legs 24, 26, and the top and bottom stretchers 28, 30. Additionally, the various tracks, or channels of the top and bottom stretchers 28, 30 and the first and second uprights 20, 22 are substantially aligned upon assembly. In particular, the front, middle, and rear tracks 70A, 70B, 70C of the first upright 20 (as well as corresponding tracks of the second upright 22), the front, middle, and rear tracks 198A, 198B, 198C of the bottom stretcher 30, and the a front, middle, and rear tracks 166A, 166B, 166C of the top stretcher 28, respectively, are substantially aligned with one another and adapted to receive a retailing accessory, such as a back board as will be subsequently described.

Although the upper and lower cleat holes 124, 134 are shown at the longitudinal midpoint $M_{L1}$ of the first base leg 24, it should be understood that the cleat holes 124, 134 are optionally located at any position along the first base leg 24, for example toward the front of the first base leg 24, toward the back of the first base leg 24, or at a variety of points along either the front portion 96 or the rear portion 98. The second base leg 24 is optionally similarly configured. Additionally or alternatively, the plurality of keyholes 108 in the first base leg 24 are optionally located away from the longitudinal midpoint $M_{L1}$ of the first base leg 24. For example, rather than the substantially H-shaped base 32, the first base leg 24, second base leg 26 and bottom stretcher 30 optionally form a substantially C-shaped or U-shaped base (not shown), where the keyholes of the respective base legs 24, 26 are located more toward the respective fronts or backs of the base legs 24, 26, for example.

In some embodiments, the base units 12 are placed on and secured to a support surface such as a floor of a store (not shown) using one or more floor anchors similar to the floor anchor 230. For example, as understood with reference to FIG. 2, the bent finger 232 of the floor anchor 230 is inserted into the front anchor slot 158B of the first base leg 24 and another floor anchor 230A is inserted into the rear anchor slot 158A. The floor anchors 230, 230A are then riveted or screwed, for example, to the retail floor to help hold the first base unit 12A in place. Any number of floor anchors and anchor slots are used as appropriate to help secure the base units 12A, 12B, and/or 12C in place.

In view of the foregoing, it should be understood that a variety of different configurations are available with the base units 12. In some embodiments, the heights of the uprights are optionally varied as desired to provide any number of unique displays. As shown in FIG. 1, the first base unit 12A and the second base unit 12B share the second base leg 26 and the second upright 22 such that the second base unit 12B is also described as an add-on unit to the first base unit 12A.

The second base unit 12B has a third base leg 348 having a third longitudinal midpoint $M_{L3}$ and a second bottom stretcher 349 tying the third base leg 348 and the second base leg 26 together proximate the second and third longitudinal midpoints $M_{L2}$, $M_{L3}$ in a similar manner previously described in association with the first base unit 12A. The second base unit 12B is substantially similar in assembly and components to the first base unit 12A, and includes a third upright 350 inserted into the third base leg 348 and maintained substantially vertically in a manner similar to that previously described in association with the first base unit 12A. However, as shown, the third upright 350 is substantially shorter than the second upright 22. In particular, the third upright 350 optionally has a height generally corresponding to the intermediate set of stretcher slots 72B (obscured, but a position of which is generally designated in FIG. 1), the third upright 350 including a pair of inner, upper stretcher slots 350A (obscured, but a position of which is generally designated in FIG. 1) corresponding in height to the intermediate set of stretcher slots 72B of the first upright 20 and inner, lower stretcher slots 350B corresponding in height to the lower stretcher slots 72C of the first upright 20 (obscured, but a position of which is generally designated in FIG. 1).

A second top stretcher 352 is secured between the third upright 350 and the second upright 22 at the height of the second set of stretcher slots 72B (obscured, but a position of which is generally designated in FIG. 1) using the inner, upper stretcher slots 350A of the third upright 350 and a set of outer, intermediate stretcher slots 22E (obscured, but a position of which is generally designated in FIG. 1) in the second upright 22.

The third base unit 12C is assembled substantially similarly and includes substantially similar components to the first base unit 12A. The third base unit 12C shares the third upright 350 with the second base unit 12B. However, the second base unit 12B has a fourth upright 360 that is substantially shorter than the first upright 20, the second upright 22, and the third upright 350. The fourth upright 360 has inner, upper stretcher slots 360A (obscured, but a position of which is generally designated in FIG. 1) that correspond in height to the lower stretcher slots 72C (obscured, but a position of which is generally designated in FIG. 1) of the first upright 20. A third top stretcher 354 is secured between the inner, upper stretcher slots 360A of the fourth upright 360 and outer, lower stretcher slots 350F (obscured, but generally designated in FIG. 1) in the third upright 350. From the foregoing, it should be understood any combination of upright heights and number of base units 12 are contemplated.

Various accessories are optionally assembled to the base units 12 to facilitate retailing of products, storage of products, or any of a variety of purposes. For example, retailing accessories such as the shelf 240, the decking member 250 (FIG. 31), the backer board 280 (FIG. 33), and the bumper member 300 (FIG. 34) are optionally assembled to one or more of the base units 12.

As one example, the shelf 240 is optionally assembled at any height to the front set of attachment points 66 of the first upright 20 and to a corresponding set of attachment points of the second upright 22 such that the shelf 240 extends forwardly, or projects forward, from the base unit 12A and in particular the front 38 of the first upright 20 and front of the second upright 22. In some embodiments, a second shelf 240A is secured to back sets of attachment points of the first and second uprights (not shown) such that the second shelf 240A extends rearwardly from the first base unit 12A and in particular the back 39 of the first upright 20 and back of the second upright 22. If desired, the first shelf 240 and the second shelf 240A are assembled at the height of the top stretcher 28 such that the top stretcher 28 extends between the upper support surface 248 of the first shelf 240 and an upper support surface 248A of the second shelf 240A, and the top surface 165 of the top stretcher 28 is substantially coplanar with the upper support surfaces 248, 248A to combine with them to form a substantially continuous first support surface $S_1$ extending both forwardly and rearwardly from the first base unit 12A.

Additionally, a second stretcher 28A is optionally secured between the first and second uprights 20, 22 at the third set of inner stretcher slots 72C (obscured, but a position of which is generally designated in FIG. 1) with third and fourth shelves 240C, 240D opposingly positioned on, and secured to the front and back attachment points of the first and second uprights 20, 22 to form a second, substantially continuous support surface $S_2$ below the first support surface $S_1$.

If desired, decking members and bumper members, such as the decking member 250 and bumper member 300 are optionally secured to the base units 12. In some embodiments, the first tab 256 (FIG. 40) of the decking member 250 is optionally received into the front guide hole 120 in the first base leg 24 and a second tab (not shown) is optionally received in a similar guide hole (not shown) in the second base leg 26 with the decking member 250 resting on, or being maintained by, the first and second base legs 24, 26 (as well as the bumper member 300 if applicable) such that the decking member 250 is a front decking member that is generally frontward extending relative to the first and second uprights 20, 22, the decking member 250 being supported on the front portion 96 of the first base leg 24 and front portion of the second base leg 26.

As show in FIG. 35B, in some embodiments, the first base unit 12A (FIG. 1) is adapted such that upon placement of the decking member 250 on the first base unit 12A, the upper support surface 258 of the decking member 250 is substantially coplanar with the upper support surface 198S of the bottom stretcher 30. If desired, a second, rearward extending decking member 250A, or rear decking member, is supported on the rear portion 98 of the first base leg 24 and a rear portion of the second base leg 26 (not shown) such that the upper support surface 258 of first decking member 250, an upper support surface 258A of the second decking member 250A, and the upper support surface 198S of the bottom stretcher 30 are all substantially coplanar and define a substantially continuous support surface $D_1$ that extends forwardly and rearwardly relative to the first and second uprights 20, 22 (FIG. 1). The substantially continuous support surfaces accomplished by the base units 12 are particularly useful for housing larger items and/or providing a larger table-like display, although the support surfaces optionally accomplish a variety of other functions as well.

Figure 40:
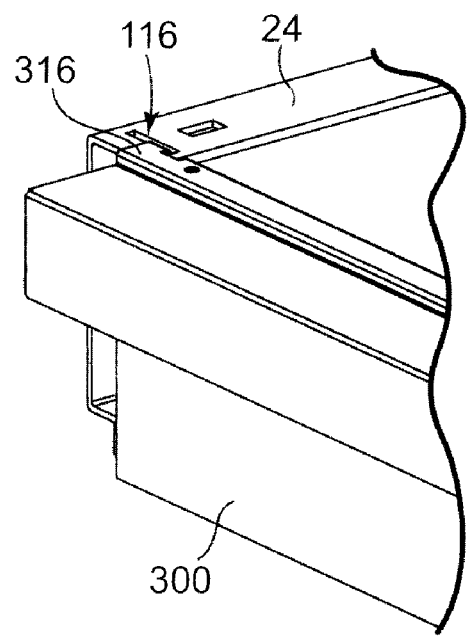
FIG. 40 is illustrative of an assembly of the bumper member of FIG. 34 and the first base leg of FIG. 15, according to some embodiments.

With respect to the bumper member 300 and the first base unit 12A and as shown in FIG. 40, the retaining finger 316 of the bumper member 300 is hooked into the front bumper slot 116 of the first base leg 24. The bumper member 300 is similarly hooked into the second base leg 26 and the bumper member 300 is rotated downwardly until the locking ramp 318 (FIG. 34) of the bumper member 300 is releasably locked into the first front retaining hole 154B (FIG. 15) in the bottom 148 of the first base leg 24. As understood with reference to FIGS. 1 and 2, the bumper member 300 is optionally substantially similarly locked into the second base leg 26, such that the bumper member 300 extends in front of portions of the first and second base legs 24, 26 and covers space between the fronts of the first and second base legs 24, 26. A rear bumper member (not shown) is optionally similarly hooked and releasably locked into the back bumper slot 118 and the first rear retaining hole 154B of the first base leg 24 and similar, back bumper slot and rear retaining hole features of the second base leg 26, such that the rear bumper extends in front of portions of the first and second base legs 24, 26 and covers space between the backs of the first and second base legs 24, 26. From the foregoing, it should be understood that it is contemplated that any number of bumper members are additionally or alternatively assembled to any of the other base units 12 as desired.

As shown FIG. 2, the backer board 280 is optionally adapted to be received in a window formed by the top stretcher 28, the first and second uprights 20, 24, and the bottom stretcher 30 upon assembly thereof, although a variety of different configurations for the backer board 280 are contemplated. For example, as shown in FIG. 1, the backer board 280 is optionally received in a window 410 formed by the top stretcher 28, the second stretcher 28A, and the first and second uprights 20, 22.

In FIG. 2, the backer board 280 is sized such that the top edge 282 is received in the middle channel 166B (FIG. 21), or track, for example, of the top stretcher 28 and the bottom edge 284 is received in one of the plurality of tracks 198 (FIGS. 23 and 24) of the bottom stretcher 30 (e.g., the middle track 198B). The first side edge 286 is received in one of the tracks of the inner track member 44 of the first upright 20 (e.g., the middle track 70B), which, as previously described, are optionally substantially similar to the front, middle, and rear tracks of the outer track member 46. The second side edge 288 is received in one of the tracks of an inner track member 44A of the second upright 22 (e.g., a middle track) that is optionally substantially similar to those of the first upright 20.

Although the backer board 280 is optionally received in the middle tracks described, the backer board 280 is optionally received in the front tracks of the top stretcher 28, the first and second uprights 20, 22 and the bottom stretcher 30 with a second backer board (not shown) received in the rear tracks of the top stretcher 28, the first and second uprights 20, 22 and the bottom stretcher 30. In some embodiments, the backer board 280 is optionally used as a shear panel to provide additional lateral support to the first base unit 12A, although the backer board 280 is generally not necessary to provide a structurally sound, substantially rigid base unit according to various embodiments.

In FIG. 1, the backer board 280 is sized to fit the window 410 such that the top edge 282 is received in one of the channels of the center channel 166 of the top stretcher 28 and the bottom edge 284 rests on the second stretcher 28A. The first side edge 286 is received in one of the tracks of the inner track member 44 of the first upright 20 (e.g., the middle track 70B), which, as previously described, are optionally substantially similar to the front, middle, and rear tracks of the outer track member 44. The second side edge 288 is received in one of the tracks of an inner track member 44A of the second upright 22 (e.g., a middle track) which are optionally substantially similar to those of the first upright 20.

The ease of assembly and versatility of the system 10 encourage efficient shelving set up and promote retail sales in a variety of different applications, although a variety of additional and/or alternate features are optionally accomplished with embodiments of the system 10. Various modifications and additions can be made to the embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

In the description, reference is made to the accompanying drawings, which form a part hereof, and in which is shown by way of illustration specific embodiments in which the invention may be practiced. In this regard, directional terminology, such as "top," "bottom," "front," "back," "left," "right," etc., is used with reference to the orientation of the Figure(s) being described. Because components of the various embodiments can be positioned in a number of different orientations, the directional terminology is used for the purposes of illustration and is in no way limiting. The detailed description, therefore, is not to be taken in a limiting sense, and the scope of the present invention is defined by the appended claims.

The invention claimed is:

1. A modular shelving system comprising:
a first upright that extends from a top end to a bottom end, defines a front, a back, an inner side, and an outer side, and has an inner channel, an outer channel, a plurality of vertically aligned and regularly spaced front slots, a plurality of vertically aligned and regularly spaced back slots, an upper pair of inner slots formed proximate the top end, and an upper pair of outer slots formed proximate the top end, the first upright including:
a first body having an upper end and a bottom end, and
a first cleat having a base portion secured in the bottom end of the first body and a narrowed, nose portion extending away from the bottom end of the first body;
a second upright that extends from a top end to a bottom end, defines a front, a back, an inner side, and an outer side, and has an inner channel, an outer channel, a plurality of vertically aligned and regularly spaced front slots, a plurality of vertically aligned and regularly spaced back slots, an upper pair of inner slots formed proximate the top end of the second upright, and an upper pair of outer slots formed proximate the top end of the second upright, the second upright including:
a second body having an upper end and a bottom end, and
a second cleat having a base portion secured in the bottom end of the second body and a narrowed, nose portion extending away from the bottom end of the second body;
an upright spanner including:
a span portion having a top side and a bottom side and extending substantially horizontally between the first and second uprights from a first end to a second end, the span portion having a top channel aligned with each of the inner channels of the first and second uprights, respectively;
a first end bracket secured to the first end of the span portion and having a first pair of hook-shaped prongs releasably secured into the upper pair of inner slots of the first upright; and
a second end bracket secured to the second end of the span portion and having a first pair of hook-shaped prongs releasably secured into the upper pair of inner slots of the second upright; and
a first rail and a second rail, each of the first and second rails defining a top surface, an inner surface, an outer surface, and a bottom surface and having an upper cleat hole formed in the top surface, a lower cleat hole formed in the bottom surface, a plurality of inner insert holes formed in the inner surface, and a plurality of outer insert holes formed in the outer surface, the first cleat of the first upright being slidably received in the upper and lower cleat holes of the first rail and the second cleat of the second upright being slidably received in the upper and lower cleat holes of the second rail such that the first and second uprights are supported substantially vertically by the first and second rails, respectively; and
a rail spanner including:
an intermediate portion having a top side and a bottom side opposite the top side and extending between the first and second rails from a first end of the rail spanner to a second end of the rail spanner, the intermediate portion having an upper channel formed in the top side, the upper channel being aligned with the inner channels of the first and second uprights, respectively;

a first retaining claw connected to the first end of the rail spanner and including a plurality of insert tabs releasably secured in the inner insert holes of the first rail; and a second retaining claw connected to the second end of the rail spanner and including a plurality of insert tabs releasably secured in the inner insert holes of the second rail, wherein the first and second retaining claws each include a lock assembly comprising a spring button, a lever, and a channel member having a button hole, and the lever is depressed to actuate the spring button within the button hole.

2. The system of claim 1, wherein the second upright has a lower pair of outer slots formed in the outer side of the second upright, the lower pair of outer slots being formed below the upper pair of outer slots, the system further comprising:

a third upright that is substantially shorter than the second upright, extends from a top end to a bottom end, defines a front, a back, an inner side, and an outer side, and has an inner channel and an outer channel, a plurality of vertically aligned and regularly spaced front slots, a plurality of vertically aligned and regularly spaced back slots, an upper pair of inner slots formed proximate the top end of the third upright, and an upper pair of outer slots formed proximate the top end of the third upright, the third upright including a third body having an upper end and a bottom end and a third cleat having a base portion secured in the bottom end of the third body and a narrowed, nose portion extending away from the bottom end of the third body; and a second upright spanner extending substantially horizontally between the second and third uprights, the second upright spanner being releasably secured in the lower pair of outer slots of the second upright and the upper pair of inner slots of the third upright.

3. The system of claim 2, wherein the rail spanner is a first rail spanner and the system further comprises:

a second rail spanner substantially similar to the first rail spanner; and a third rail substantially similar to the second rail, the second rail spanner being releasably secured in the outer insert holes of the second rail and in a plurality of inner insert holes of the third rail, and further wherein the third cleat of the third upright is slidably received in an upper cleat hole and a lower cleat hole formed in the third rail such that the third upright is supported substantially vertically by the third rail.

4. The system of claim 1, further comprising a backer board having an outer perimeter, where a portion of the outer perimeter is secured in the inner channels of the first and second uprights, respectively.

5. The system of claim 4, wherein another portion of the outer perimeter is secured in the upper channel of the rail spanner.

6. The system of claim 1, further comprising first and second decking members maintained by the first and second rails.

7. The system of claim 6, wherein the first and second decking members each have a substantially planar upper surface, the substantially planar upper surfaces of the first and second decking members being maintained substantially coplanar to one another by the first and second rails.

8. The system of claim 1, wherein the narrowed nose portion of the first cleat forks into a first spur and a second spur and the lower cleat hole of the first rail includes a first portion for receiving the first spur and a second portion for receiving the second spur, the first and second portions being separate from one another.

9. The system of claim 1, further comprising a first shelving member having a substantially planar top surface and a pair of attachment brackets, the pair of attachment brackets of the first shelving member being releasably secured in the front slots of the first and second uprights such that the first shelving member projects frontward from the first and second uprights.

10. The system of claim 9, wherein the upright spanner is a first upright spanner and the system further comprises:

a second upright spanner substantially similar to the first upright spanner and releasably secured to the inner sides of the first and second uprights, respectively, the second upright spanner having a top surface; and a second shelving member having a substantially planar top surface and a pair of attachment brackets, the pair of attachment brackets of the second shelving member being releasably secured in the back slots of the first and second uprights such that the second shelving member projects backward from the first and second uprights, wherein the substantially planar top surfaces of the first and second shelving members and the top surface of the second upright spanner are substantially coplanar to define a substantially continuous support surface.

11. A method of assembling a modular shelving system, the method comprising:

providing the modular shelving system of claim 1, forming an H-shaped base structure by releasably hooking the rail spanner into a mid-section of the first rail and a mid-section of the second rail;

placing the H-shaped base structure on a support surface;

sliding the first upright into the top surface of the first rail by grasping the first body of the first upright and sliding the narrowed, nose portion of the first cleat extending from the bottom end of the first body into the upper and lower cleat holes of the first rail such that the narrowed, nose portion of the first cleat and an upper, wider portion of the first cleat engage the first rail;

sliding the second upright into the top surface of the second rail by grasping the second body of the second upright and sliding the second cleat at the bottom end of the second body of the second upright into the upper and lower cleat holes of the second rail; and releasably hooking the upright spanner into the first and second uprights such that the upright spanner extends substantially horizontally between the first and second uprights and substantially perpendicularly to the first and second rails, the upright spanner including a first pair of hook-shaped prongs at the first end bracket and the second pair of hook-shaped prongs at the second end bracket.

12. The method of claim 11, wherein the rail spanner includes the first retaining claw at the first end of the rail spanner, the first retaining claw having the plurality insert tabs which are substantially mushroom-shaped, each of the substantially mushroom-shaped insert tabs having a narrowed base portion and a widened cap portion, wherein the first rail has the plurality of inner insert holes, each of the inner insert holes having a widened top portion and a narrowed lower portion, and further wherein releasably hooking the rail spanner into the first rail includes inserting the widened cap portions of the plurality of substantially mushroom-shaped insert tabs into the widened top portions of the plurality of inner insert holes and sliding the first retaining claw downwardly such that the widened cap portions of the plurality of substantially mushroom-shaped insert tabs are retained behind the narrowed lower portions of the plurality of inner insert holes.

13. The method of claim 11, wherein the rail spanner is secured to the first and second rails such that a top portion of the rail spanner projects above the top surface of the first rail and the top surface of the second rail.

* * * * *